US012008969B2

(12) United States Patent
Kim et al.

(10) Patent No.: US 12,008,969 B2
(45) **Date of Patent: *Jun. 11, 2024**

(54) BACKLIGHT SYSTEM, DISPLAY DEVICE INCLUDING THE BACKLIGHT SYSTEM AND METHOD OF TRANSFERRING DATA IN THE BACKLIGHT SYSTEM

(71) Applicant: SAMSUNG ELECTRONICS CO., LTD., Suwon-si (KR)

(72) Inventors: Kangjoo Kim, Hwaseong-si (KR); Sugyeung Kang, Suwon-si (KR); Yongsik Kwak, Seoul (KR); Yongil Kwon, Suwon-si (KR); Sunkwon Kim, Hwaseong-si (KR); Uijong Song, Suwon-si (KR); Sewoong Ahn, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/958,835

(22) Filed: Oct. 3, 2022

(65) Prior Publication Data

US 2023/0028210 A1 Jan. 26, 2023

Related U.S. Application Data

(63) Continuation of application No. 17/373,092, filed on Jul. 12, 2021, now Pat. No. 11,488,548.

(30) Foreign Application Priority Data

Oct. 8, 2020 (KR) ........................ 10-2020-0130199
Nov. 17, 2020 (KR) ........................ 10-2020-0154074

(51) Int. Cl.
*G09G 3/34* (2006.01)

(52) U.S. Cl.
CPC ... *G09G 3/3426* (2013.01); *G09G 2310/0286* (2013.01); *G09G 2310/0294* (2013.01); *G09G 2320/0233* (2013.01)

(58) Field of Classification Search
None
See application file for complete search history.

(56) References Cited

U.S. PATENT DOCUMENTS

| | | |
|---|---|---|
| 8,482,698 B2 | 7/2013 | Atkins |
| 8,786,191 B2 | 7/2014 | Kuang et al. |

(Continued)

FOREIGN PATENT DOCUMENTS

| | | |
|---|---|---|
| KR | 10-1885186 B1 | 8/2018 |
| KR | 10-2019-0006007 A | 1/2019 |
| KR | 10-2012994 B1 | 8/2019 |

*Primary Examiner* — Matthew Yeung
(74) *Attorney, Agent, or Firm* — Sughrue Mion, PLLC

(57) ABSTRACT

A backlight system includes a backlight and a master driving circuit. The backlight includes a plurality of slave driving circuits and a plurality of light sources driven by the plurality of slave driving circuits, wherein the plurality of slave driving circuits are arranged in a matrix of driving rows and driving columns such that first through m-th slave driving circuits, where m is a positive integer greater than one, are arranged in each driving row of the driving rows, and the first through m-th slave driving circuits are connected in a daisy chain structure. The master driving circuit is configured to generate a plurality of input data signals, wherein each input data signal of the plurality of input data signals corresponds to the each driving row, and the each input data signal includes first through m-th packets including luminance data corresponding to the first through m-th slave driving circuits.

20 Claims, 26 Drawing Sheets

(56) References Cited

U.S. PATENT DOCUMENTS

| | | | | |
|---|---|---|---|---|
| 8,878,828 | B2 | 11/2014 | Baek et al. | |
| 10,121,454 | B2 | 11/2018 | Ninan et al. | |
| 2005/0168429 | A1 | 8/2005 | Chou | |
| 2005/0206605 | A1* | 9/2005 | Park | G09G 3/3648 345/98 |
| 2006/0132398 | A1* | 6/2006 | Kim | G09G 3/20 345/76 |
| 2007/0223477 | A1 | 9/2007 | Eidson | |
| 2009/0066676 | A1 | 3/2009 | Jo | |
| 2016/0170930 | A1* | 6/2016 | Weng | G06F 1/26 710/110 |
| 2018/0004321 | A1* | 1/2018 | Kuroiwa | G06F 3/0412 |
| 2018/0350308 | A1 | 12/2018 | Zhang | |
| 2019/0385504 | A1* | 12/2019 | Jeong | G09G 5/008 |

* cited by examiner

10

BACKLIGHT SYSTEM, DISPLAY DEVICE INCLUDING THE BACKLIGHT SYSTEM AND METHOD OF TRANSFERRING DATA IN THE BACKLIGHT SYSTEM

CROSS-REFERENCE TO RELATED APPLICATION

This is a Continuation of U.S. application Ser. No. 17/373,092 filed Jul. 12, 2021, which is U.S. non-provisional application claims priority under 35 USC § 119 to Korean Patent Application No. 10-2020-0130199, filed on Oct. 8, 2020, and Korean Patent Application No. 10-2020-0154074, filed on Nov. 17, 2020, in the Korean Intellectual Property Office (KIPO), the disclosures of which are incorporated by reference herein in their entireties.

BACKGROUND

1. Field

The disclosure relates to semiconductor integrated circuits, and more particularly to a backlight system, a display device including the backlight system and a method of transferring data in the backlight system.

2. Description of Related Art

A display device such as a liquid crystal display (LCD) device represents gray scales of an image by adjusting an amount of transmission light from a backlight source. The display may include a backlight source of various kinds such as a cold cathode fluorescent lamp (CCFL) scheme, a directed-down type light emitting diode (LED) scheme, an edge type LED scheme, a local dimming scheme, etc. Recently a full array local dimming (FALD) scheme arranging LEDs in a two-dimensional array is noted because the FALD scheme results in high image quality. The FALD scheme is widely adopted in display products requiring high image quality such as a premium TV, but it is difficult to drive a huge number of backlight sources (e.g. LED light sources) by the FALD scheme. Noise may be increased due to increase of the number of driving integrated circuits (ICs), nonuniformity of the driving ICs, increase of connectors to a printed circuit board (PCB), etc., and it is difficult to secure luminance quality of the backlight sources.

SUMMARY

Provided are a backlight system and a display device including the backlight system capable of efficiently performing the local dimming.

Provided are a method of transferring data in the backlight system capable of efficiently loading luminance data.

In accordance with an aspect of the disclosure, a backlight system includes a backlight including a plurality of slave driving circuits and a plurality of light sources driven by the plurality of slave driving circuits, wherein the plurality of slave driving circuits are arranged in a matrix of driving rows and driving columns such that first through m-th slave driving circuits, where m is a positive integer greater than one, are arranged in each driving row of the driving rows, and the first through m-th slave driving circuits are connected in a daisy chain structure; and a master driving circuit configured to generate a plurality of input data signals, wherein each input data signal of the plurality of input data signals corresponds to the each driving row, and the each input data signal includes first through m-th packets including luminance data corresponding to the first through m-th slave driving circuits.

In accordance with an aspect of the disclosure, a display device includes a display panel including a plurality of pixels configured to display an image corresponding to input image data; a display panel driver configured to drive the display panel based on the input image data; a backlight including a plurality of slave driving circuits and a plurality of light sources driven by the plurality of slave driving circuits, wherein the plurality of slave driving circuits are arranged in a matrix of driving rows and driving columns such that first through m-th slave driving circuits, where m is a positive integer greater than one, are arranged in each driving row of the driving rows, and the first through m-th slave driving circuits are connected in a daisy chain structure; and a master driving circuit configured to generate a plurality of input data signals, wherein each input data signal of the plurality of input data signals corresponds to the each driving row, and the each input data signal includes first through m-th packets including luminance data corresponding to the first through m-th slave driving circuits.

In accordance with an aspect of the disclosure, a method of transferring data in a backlight system including a plurality of slave driving circuits and a plurality of light sources driven by the plurality of slave driving circuits, the plurality of slave driving circuits being arranged in a matrix of driving rows and driving columns such that first through m-th slave driving circuits, where m is a positive integer greater than one, arranged in each driving row of the driving rows are connected in a daisy chain structure, includes generating an input data signal including first through m-th packets including virtual identifiers and luminance data corresponding to the first through m-th slave driving circuits such that values of the virtual identifiers are sequentially increased or sequentially decreased; transferring the input data signal sequentially from an m-th slave driving circuit of the first through m-th slave driving circuits to a first slave driving circuit of the first through m-th slave driving circuits by applying the input data signal to the m-th slave driving circuit; in each of the first through m-th slave driving circuits, increasing or decreasing the a value of a virtual identifier of a reception packet transferred from a latter stage slave driving circuit to transfer a transmission packet including the virtual identifier having the increased or decreased value to a former stage slave driving circuit; and in the each of the first through m-th slave driving circuits, storing the luminance data included in the reception packet based on a result of comparing the value of the virtual identifier of the reception packet with a fixed address.

The backlight system according to example embodiments may reduce the number of wirings of the backlight and enhance noise margin by connecting the slave driving circuits in the daisy chain structure and transferring the luminance data by a digital scheme.

In addition, the backlight system and the method of transferring luminance data according to example embodiments may reduce the size of the backlight and increase the speed of the local dimming operation by loading the luminance data to the corresponding slave driving circuit among the plurality of slave driving circuits connected in the daisy chain structure using the virtual identifier to omit configuration and operation for imposing identifiers to the slave driving circuits.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION OF EMBODIMENTS

Figure 1:
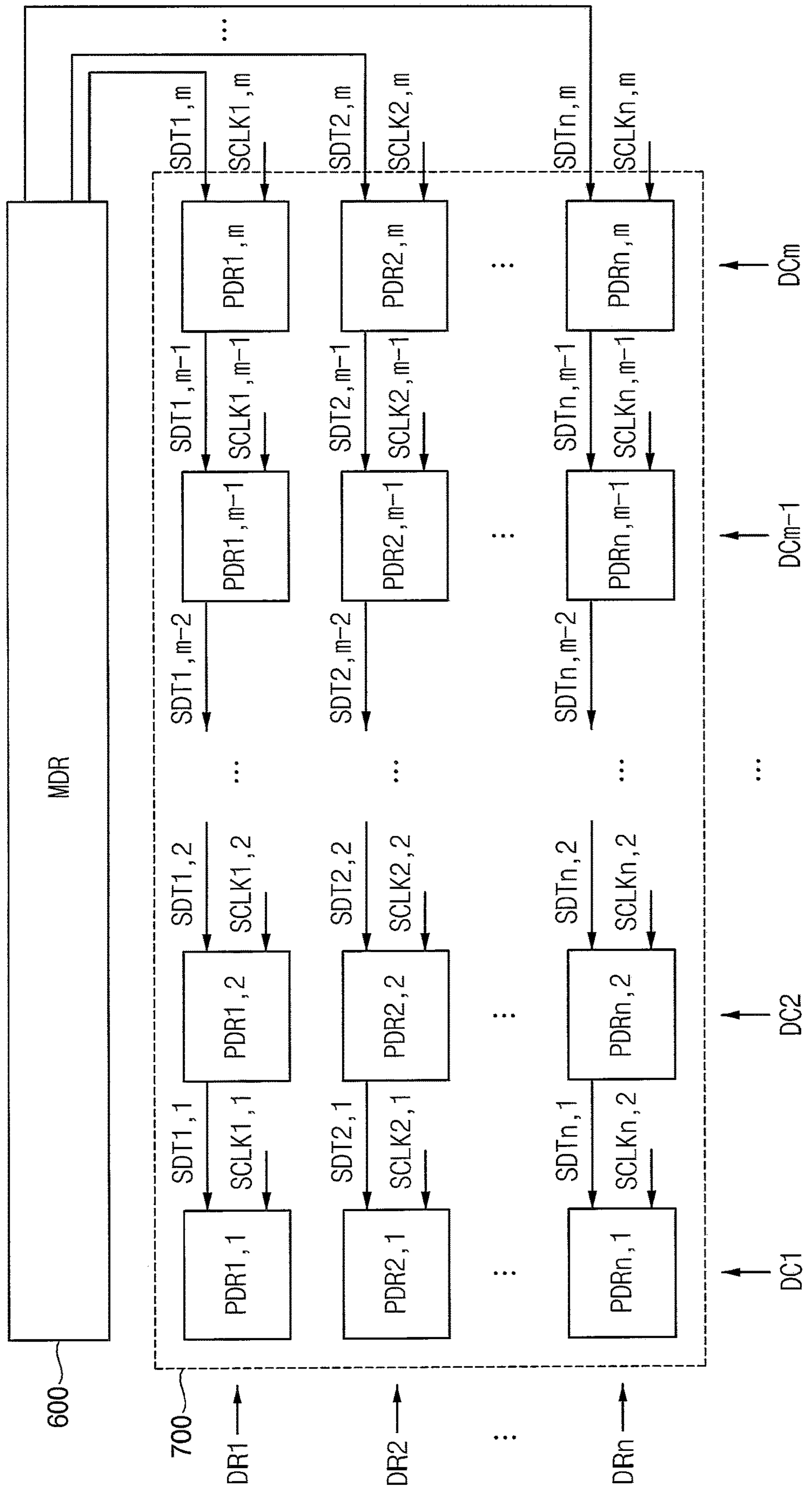
FIG. 1 is a block diagram illustrating a backlight system according to example embodiments.

Various example embodiments will be described more fully hereinafter with reference to the accompanying drawings, in which some example embodiments are shown. In the drawings, like numerals refer to like elements throughout. Duplicate descriptions of various elements may be omitted.

As is traditional in the field, embodiments may be described and illustrated in terms of blocks which carry out a described function or functions. These blocks, which may be referred to herein as units or modules or the like, or by names such as driver, controller, device, or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

FIG. 1 is a block diagram illustrating a backlight system according to example embodiments.

Referring to FIG. 1, a backlight system 10 may include a master driving circuit MDR 600 and a backlight 700, which may be for example a backlight unit.

The backlight 700 may include a plurality of slave driving circuits PDR1,1~PDRn,m and a plurality of light sources driven by the plurality of slave driving circuits PDR1,1~PDR1,m. The plurality of light sources are omitted in FIG. 1 for convenience of illustration, and examples of the light sources included in the backlight 700 will be further described with reference to FIGS. 6 through 9.

The plurality of slave driving circuits PDR1,1~PDRn,m, where each of n and m is a positive integer greater than one, may be arranged in a matrix of driving rows DR1~DRn and driving columns DC1~DCm. As illustrated in FIG. 1, first through m-th slave driving circuits PDRi,1~PDRi,m (i=1~n) arranged in each driving row DRi may be connected in a daisy chain structure. For clarity of description, throughout the disclosure, the character "~" may be used to indicated "through" or "to." For example, the expression PDR1,1~PDRn,m may indicate PDR1,1 through PDRn,m.

The master driving circuit MDR 600 may generate a plurality of input data signals SDT1,m~SDTn,m respectively corresponding to the plurality of driving rows DR1~DRn. Each input data signal SDTi,m corresponding to each driving row DRi may include first through m-th packets including luminance data to be loaded respectively to the first through m-th slave driving circuits PDRi,1~PDRi,m. Examples of the data signal and the packet transferred in the backlight system 10 will be further described below with reference to FIG. 2.

The master driving circuit MDR 600 may apply each input data signal SDTi,m to the m-th slave driving circuit PDRi,m, which is the last slave driving circuit in the daisy chain. The first through m-th slave driving circuits PDRi,1~PDRi,m arranged in each driving row DRi may transfer each input data signal SDTi,m sequentially from the m-th slave driving circuit PDRi,m to the first slave driving circuit PDRi,1. In other words, each slave driving circuit PDRi,j (i=1~n, j=1~m) arranged in each driving row DRi may receive a data signal SDTi,j transferred from a latter slave driving circuit PDRi,j+1, which may be, for example, a slave driving circuit in a latter stage than a stage of the slave driving circuit PDRi,j, and may transfer a data signal SDTi,j−1 to a former slave driving circuit PDRi,j−1, which may be a slave driving circuit in a former stage than a stage of the slave driving circuit PDRi,j.

The plurality of slave driving circuits PDR1,1~PDRn,m may receive clock signals SCLK1,1~SCLKn,m, respectively, and operate based on the receive clock signal. Example embodiments of providing the clock signals SCLK1,1~SCLKn,m will be described below with reference to FIGS. 10 through 12.

Conventional backlight systems adopt a direct driving scheme or a peer-to-peer driving scheme in which a plurality of slave driving circuits are connected to a master driving circuit through respective connection lines and the master driving circuit control directly each of the plurality slave driving circuits. In this case, the connection lines are increased as the number of the plurality of slave driving circuits, design margin is degraded by complex routing of the connection lines and enlargement of a display device is limited.

To simplify the routing of the connection lines, a backlight panel may be divided into a plurality of sub panels and the plurality of sub panels may be controlled by a plurality of master driving circuits. However, the problem of the complex routing may remain still and the local dimming may not be uniform due to characteristic deviations of the plurality of master driving circuits.

The backlight system according to example embodiments may reduce the number of wirings of the backlight and enhance noise margin by connecting the slave driving circuits in the daisy chain structure and transferring the luminance data by a digital scheme.

Figure 2:
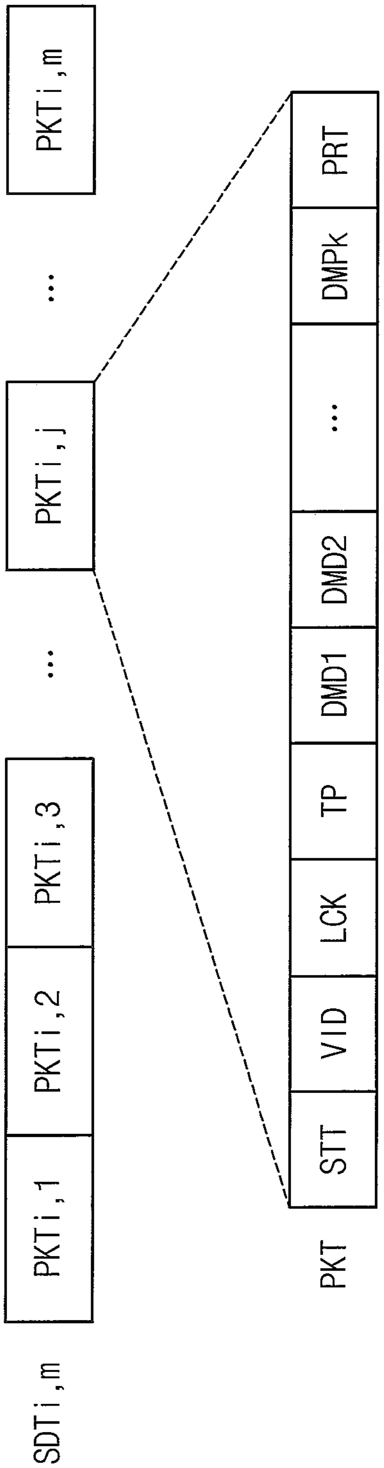
FIG. 2 is a diagram illustrating a data signal and a packet transferred in a backlight system according to example embodiments.

FIG. 2 is a diagram illustrating a data signal and a packet transferred in a backlight system according to example embodiments.

Referring to FIGS. 1 and 2, each input data signal SDTi,m generated from the master driving circuit MDR 600 may include a plurality of packets, that is, first through m-th packets PKTi,1~PKTi,m corresponding to the first through m-th slave driving circuits PDRi,1~PDRi,m arranged in each driving row DRi. As described above, each input data signal SDTi,m may be applied to the m-th slave driving circuit SDTi,m in the last stage. In this case, the first packet PKTi,1 corresponding to the first slave driving circuit SDTi,1 may be disposed at the head of each input data signal SDTi,m such that the first packet PKTi,1 may be output first from the master driving circuit MDR 600.

FIG. 2 illustrates an example embodiment of a format of a packet PKT. The packet PKT may include a start identifier STT, a virtual identifier VID, a lock identifier LCK, a type identifier TP, luminance data DMD1~DMDk, and parity bits PRT.

The start identifier STT may indicate a start position of the packet PKT. For example, the start identifier STT may be one-bit data and each slave driving circuit may detect the start of packet PKT when the start identifier STT has a value of 0. The size or the total bit number of the packet PKT may be determined in advance, and each slave driving circuit may recognize, as one packet PKT, data bits corresponding to the total bit number received after the start identifier STT.

The virtual identifier VID may indicate the slave driving circuit corresponding to the packet PKT. As will be described below with reference to FIG. 3 through 5, the value of the virtual identifier VID may be sequentially increased or sequentially decreased while passing through the slave driving circuits in the daisy chain. The corresponding luminance data may be transferred efficiently to a target slave driving circuit using the virtual identifier VID.

The lock identifier LCK may indicate whether the virtual identifier VID is fixed. For example, the rock identifier LCK may be one-bit data, the virtual identifier VID may be changed while passing through the slave driving circuits when the lock identifier LCK has a value of 0, and the virtual identifier VID may be fixed with the value output from the master driving circuit MDR 600 without change when the lock identifier LCK has a value of 1.

The type identifier TP may indicate a type of the packet PKT. According to the value of the type identifier TP, the type identifier TP may indicate whether the packet PKT includes the luminance data, whether the packet PKT includes control data other than the luminance data, a row address of local dimming blocks corresponding to the luminance data, an operation mode, etc.

The luminance data DMD1~DMDk may correspond to a plurality of local dimming blocks. The luminance data DMD1~DMDk may be replaced with other data depending on the type of the packet PKT.

The parity bits PRT may be used to check errors of the luminance data DMD1~DMDk. Each slave driving circuit may include a decoder DEC as will be described below with reference to FIG. 13, and the decoder DEC may detect the error of the luminance data DMD1~DMDk based on the parity bits PRT. When it is determined that the luminance data DMD1~DMDk include an error, each slave driving circuit may discard the received luminance data DMD1~DMDk and maintain the luminance level corresponding to the previously received luminance data. The image quality may be degraded when the luminance data including errors are used, and the validity of the luminance data DMD1~DMDk may be verified using the parity bits PRT. In some example embodiments, cyclical redundancy check (CRC) bits may be used instead of the parity bits PRT to enforce the validity of the DMD1~DMDk.

Figure 3:
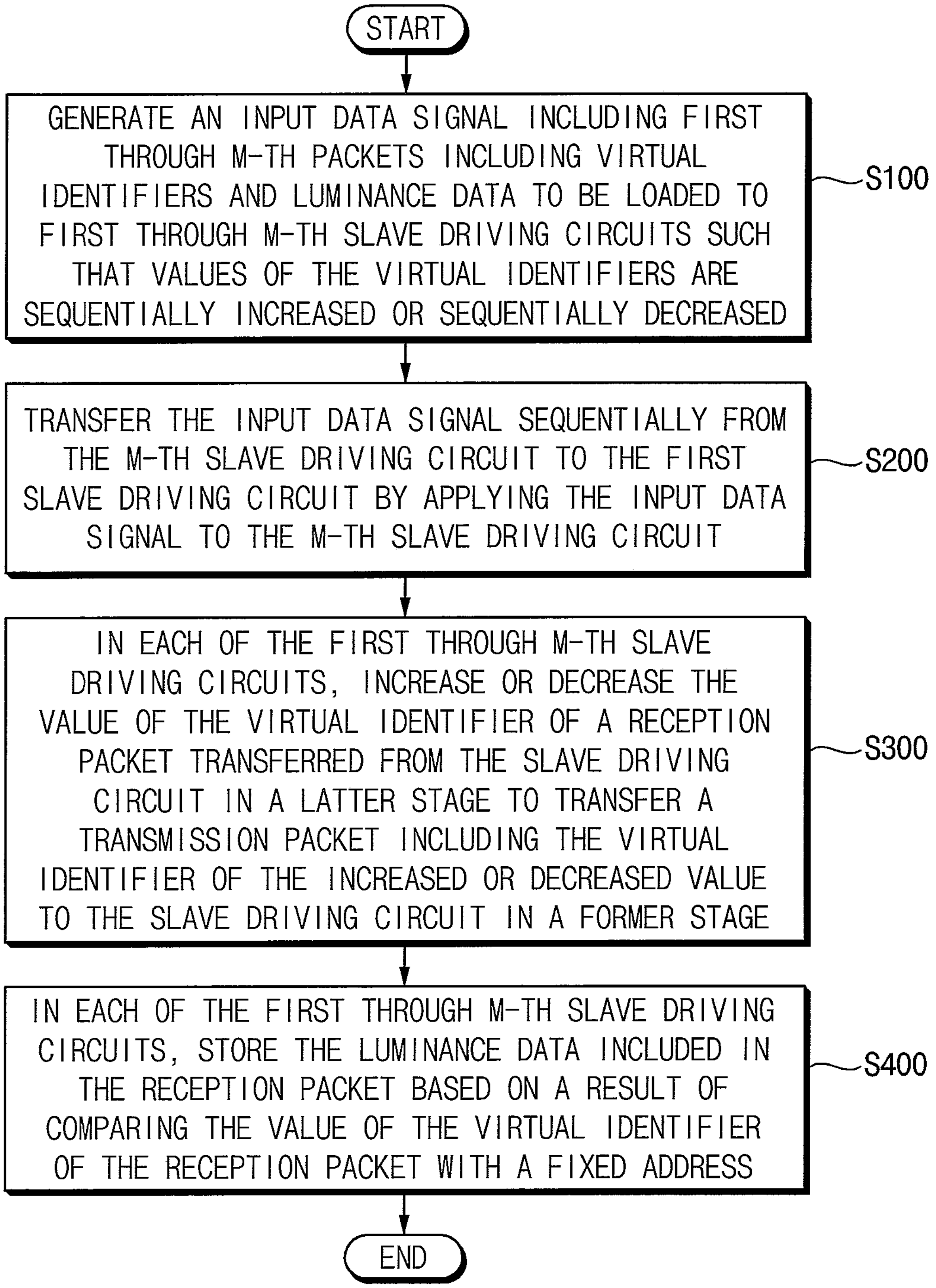
FIG. 3 is a flow chart illustrating a method of transferring data in a backlight system according to example embodiments.

FIG. 3 is a flow chart illustrating a method of transferring data in a backlight system according to example embodiments.

FIG. 3 illustrates a method of transferring data in a backlight system as described above. The backlight system includes a plurality of slave driving circuits and a plurality of light sources driven by the plurality of slave driving circuits. The plurality of slave driving circuits are arranged in a matrix of driving rows and driving columns such that first through m-th slave driving circuits arranged in each driving row are connected in a daisy chain structure.

Referring to FIG. 3, at operation S100 an input data signal including first through m-th packets including virtual identifiers and luminance data to be loaded to the first through m-th slave driving circuits may be generated such that values of the virtual identifiers are sequentially increased or sequentially decreased.

At operation S200, the input data signal may be transferred sequentially from the m-th slave driving circuit to the first slave driving circuit by applying the input data signal to the m-th slave driving circuit.

In each of the first through m-th slave driving circuits, at operation S300 the value of the virtual identifier of a reception packet transferred from the slave driving circuit in a latter stage may be increased or decreased in order to transfer a transmission packet including the virtual identifier having the increased or decreased value to the slave driving circuit in a former stage.

In each of the first through m-th slave driving circuits, at operation S400 the luminance data included in the reception packet may be stored based on a result of comparing the value of the virtual identifier of the reception packet with a fixed address.

Figure 4:
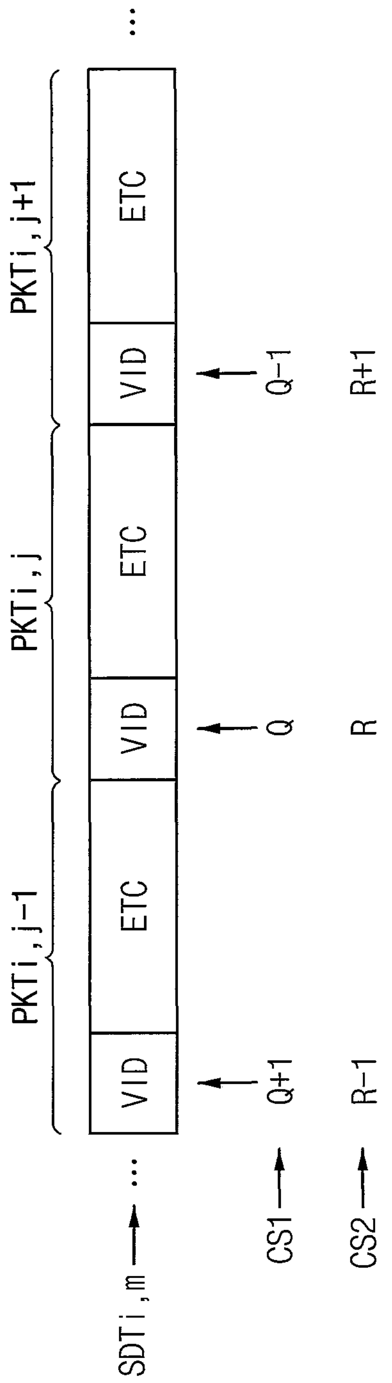
FIG. 4 and FIG. 5 are diagrams for describing a virtual identifier included in a data signal transferred in a backlight system according to example embodiments.
Figure 5:
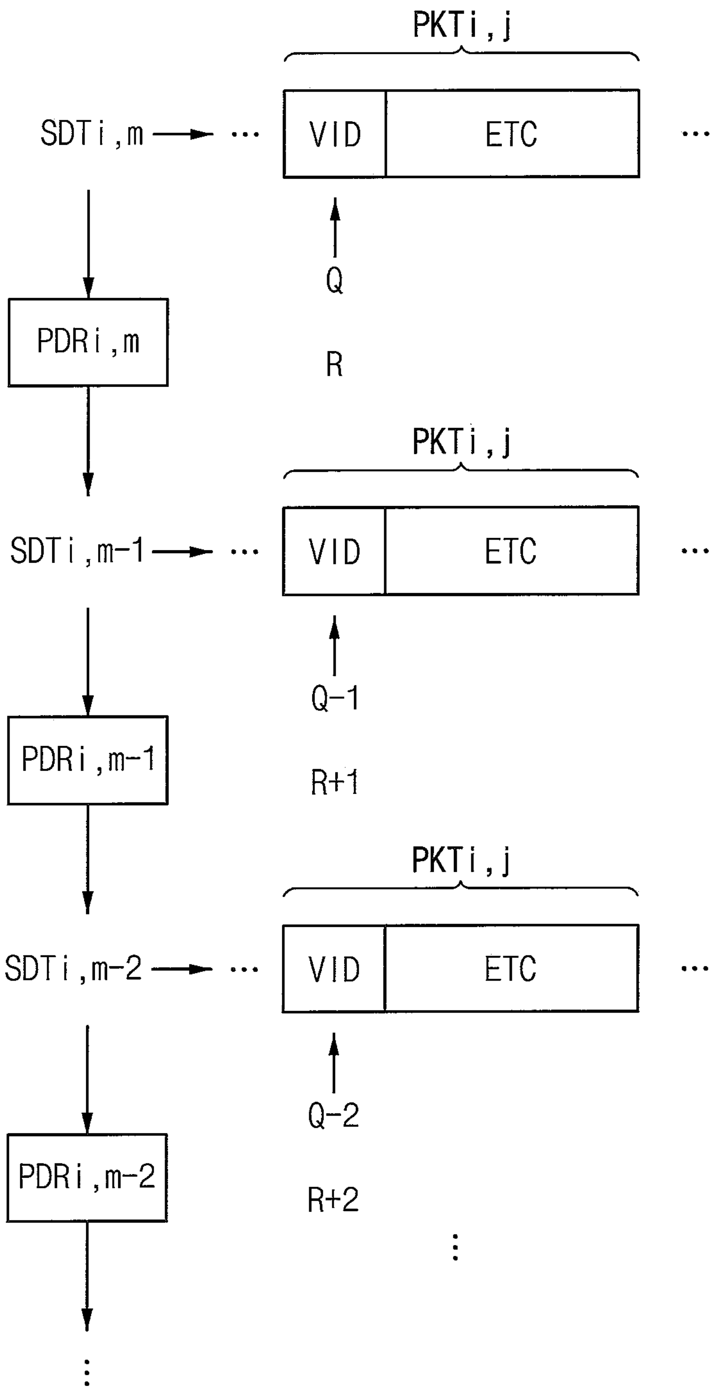

FIGS. 4 and 5 are diagrams for describing a virtual identifier included in a data signal transferred in a backlight system according to example embodiments.

In FIGS. 4 and 5, VID indicates the virtual identifier as described with reference to FIG. 2 and ETC indicates the other portion of the packet except the virtual identifier VID. FIG. 4 illustrates each input data signal SDTi,m that is output from the master driving circuit MDR 600 and applied to the m-th slave driving circuit PDRi,m of each driving row DRi.

Referring to FIGS. 1 through 4, the master driving circuit MDR 600 may generate each input data signal SDTi,m corresponding to each driving row DRi such that values of the virtual identifiers included in the first through m-th packets PKTi,1~PKTi,m are sequentially increased or sequentially decreased.

In some example embodiments, as a first case CS1, the master driving circuit MDR 600 may generate each input data signal SDTi,m by sequentially decreasing the values of the virtual identifiers VID included in the first through m-th packets PKTi,1~PKTi,m. For convenience of illustration, FIG. 4 illustrates the three packets PKTi,j−1, PKTi,j and PKTi,j+1 that are sequentially output from the master driving circuit MDR 600, and the values of the virtual identifiers VID may be sequentially decreased as Q+1, Q and Q−1.

In some example embodiments, as a second case CS2, the master driving circuit MDR 600 may generate each input data signal SDTi,m by sequentially increasing the values of the virtual identifiers VID included in the first through m-th packets PKTi,1~PKTi,m. As illustrated in FIG. 4, the values of the virtual identifiers VID included in the three packets PKTi,j−1, PKTi,j and PKTi,j+1 may be sequentially increased as R−1, R and R+1.

Referring to FIGS. 1 and 5, each of the first through m-th slave driving circuits PDRi,1~PDRi,m in each driving row DRi may increase or decrease the value of the virtual identifier VID of a reception packet transferred from the slave driving circuit in a latter stage to transfer a transmission packet including the virtual identifier of the increased or decreased value to the slave driving circuit in a former stage. In the first case CS1 of FIG. 4, the value of the packet PKTi,j may be decreased by one as Q, Q−1 and Q−2 while the packet PKTi,j passes through the slave driving circuits SDTi,m, SDTi,m−1 and SDTi,m−2. In the second case CS2 of FIG. 4, the value of the packet PKTi,j may be increased by one as R, R+1 and R+2 while the packet PKTi,j passes through the slave driving circuits SDTi,m, SDTi,m−1 and SDTi,m−2.

Examples of the data transfer method using the virtual identifier VID will be further described below with reference to FIGS. 14 and 15.

Figure 6:
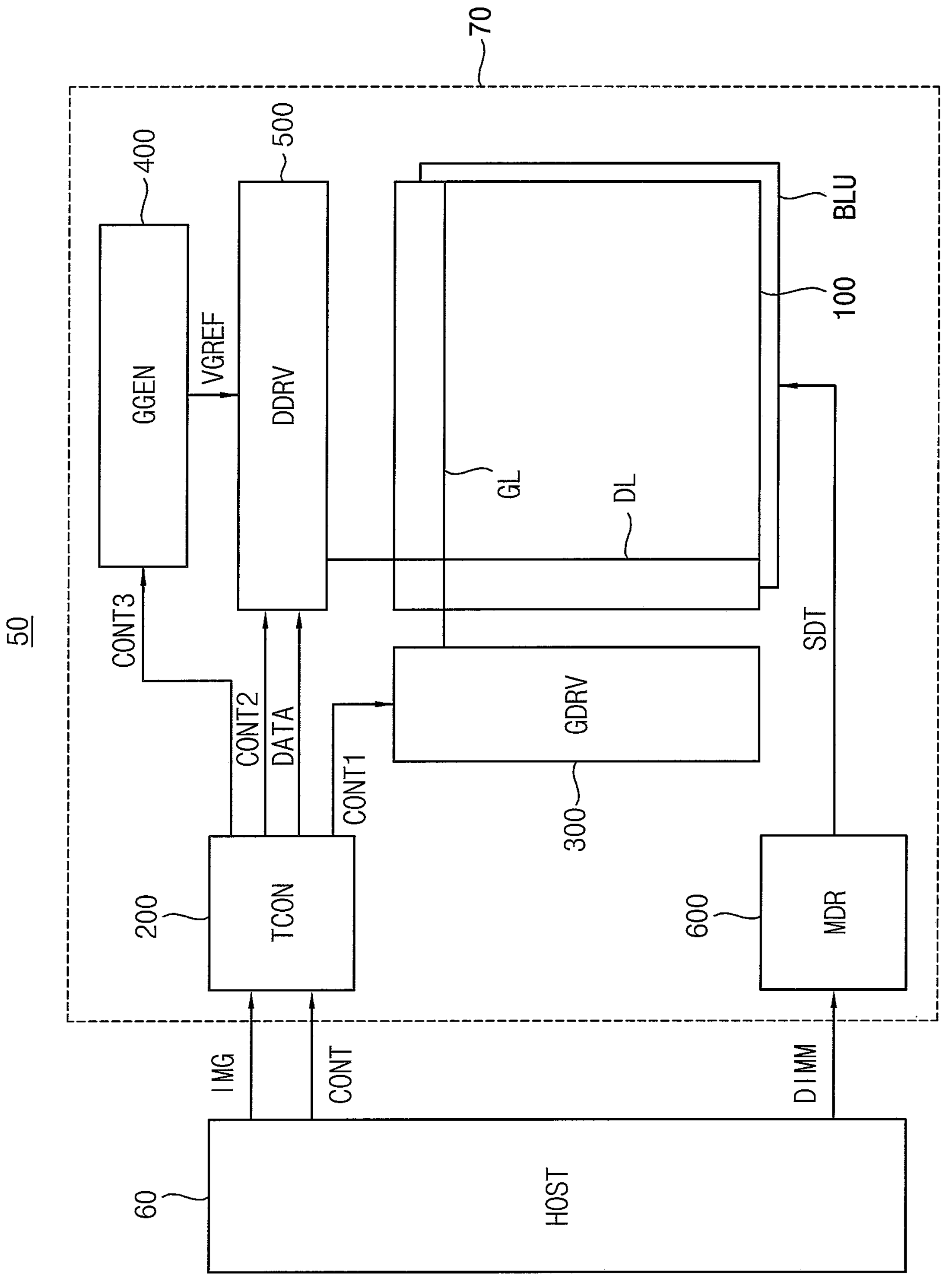
FIG. 6 is a block diagram illustrating a display system according to example embodiments.

FIG. 6 is a block diagram illustrating a display system according to example embodiments.

Referring to FIG. 6, a display system 50 may include a host device 60 and a display device 70. The display device 70 may include a display panel 100 and a display panel driver. The display panel driver may include a driving controller 200, which may be, for example, a timing controller (TCON), a gate driver (GDRV) 300, a gamma reference voltage generator (GGEN) 400 and a data driver DDRV 500, which may be, for example, a source driver. The display device 70 may further include a backlight BLU for providing light to the display panel 100 and a master driving circuit MDR 600 for driving the backlight BLU. In embodiments, the backlight BLU may be, for example, a backlight unit. The host device 60 may provide input image data IMG to the driving controller 200 and provide dimming information DIMM corresponding to the input image data IMG to the master driving circuit MDR 600. The dimming information DIMM may include the dimming data.

The display panel 100 includes a plurality of gate lines GL, a plurality of data lines DL, and a plurality of pixels electrically connected to the gate lines GL and the data lines DL. The gate lines GL may extend in a first direction and the data lines DL may extend in a second direction crossing the first direction.

The display panel 100 may be a liquid crystal display panel. The display panel 100 may include a first base substrate including the gate lines GL, the data lines DL, the pixels and the switching element, a second base substrate facing the first base substrate and including a common electrode, and a liquid crystal layer disposed between the first base substrate and the second base substrate.

The driving controller 200 may receive the input image data IMG and an input control signal CONT from the host device 60. For example, the input image data IMG may include red image data, green image data, and blue image data. In some embodiments, the input image data IMG may include white image data. In some embodiments, the input image data IMG may include magenta image data, cyan image data, and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, and a data signal DATA based on the input image data IMG and the input control signal CONT.

The driving controller 200 generates the first control signal CONT1 for controlling an operation of the gate driver GDRV 300 based on the input control signal CONT, and outputs the first control signal CONT1 to the gate driver GDRV 300. The first control signal CONT1 may include a vertical start signal and a gate clock signal.

The driving controller 200 generates the second control signal CONT2 for controlling an operation of the data driver DDRV 500 based on the input control signal CONT, and outputs the second control signal CONT2 to the data driver DDRV 500. The second control signal CONT2 may include a horizontal start signal and a load signal.

The driving controller 200 generates the data signal DATA based on the input image data IMG The driving controller 200 outputs the data signal DATA to the data driver DDRV 500.

The driving controller 200 generates the third control signal CONT3 for controlling an operation of the gamma reference voltage generator GGEN 400 based on the input control signal CONT, and outputs the third control signal CONT3 to the gamma reference voltage generator GGEN 400.

In some example embodiments, the driving controller 200 may generate the dimming information DIMM based on the input image data IMG and the driving controller instead of the host device 60 may provide the dimming information DIMM to the master driving circuit MDR 600. In some example embodiments, as illustrated in FIG. 6, the dimming information DIMM may be provided from the host device 60 to the master driving circuit MDR 600.

The gate driver GDRV 300 generates gate signals for driving the gate lines GL in response to the first control signal CONT1 received from the driving controller 200. The gate driver GDRV 300 may output the gate signals to the gate lines GL.

The gamma reference voltage generator GGEN 400 generates a gamma reference voltage VGREF in response to the third control signal CONT3 received from the driving controller 200. The gamma reference voltage generator GGEN 400 provides the gamma reference voltage VGREF to the data driver DDRV 500. The gamma reference voltage VGREF has a value corresponding to a level of the data signal DATA. The gamma reference voltage generator GGEN 400 may be disposed in the driving controller 200, or in the data driver DDRV 500.

The data driver DDRV 500 receives the second control signal CONT2 and the data signal DATA from the driving controller 200, and receives the gamma reference voltages VGREF from the gamma reference voltage generator GGEN 400. The data driver DDRV 500 converts the data signal DATA into data voltages having an analog type using the gamma reference voltages VGREF. The data driver DDRV 500 outputs the data voltages to the data lines DL.

Figure 7:
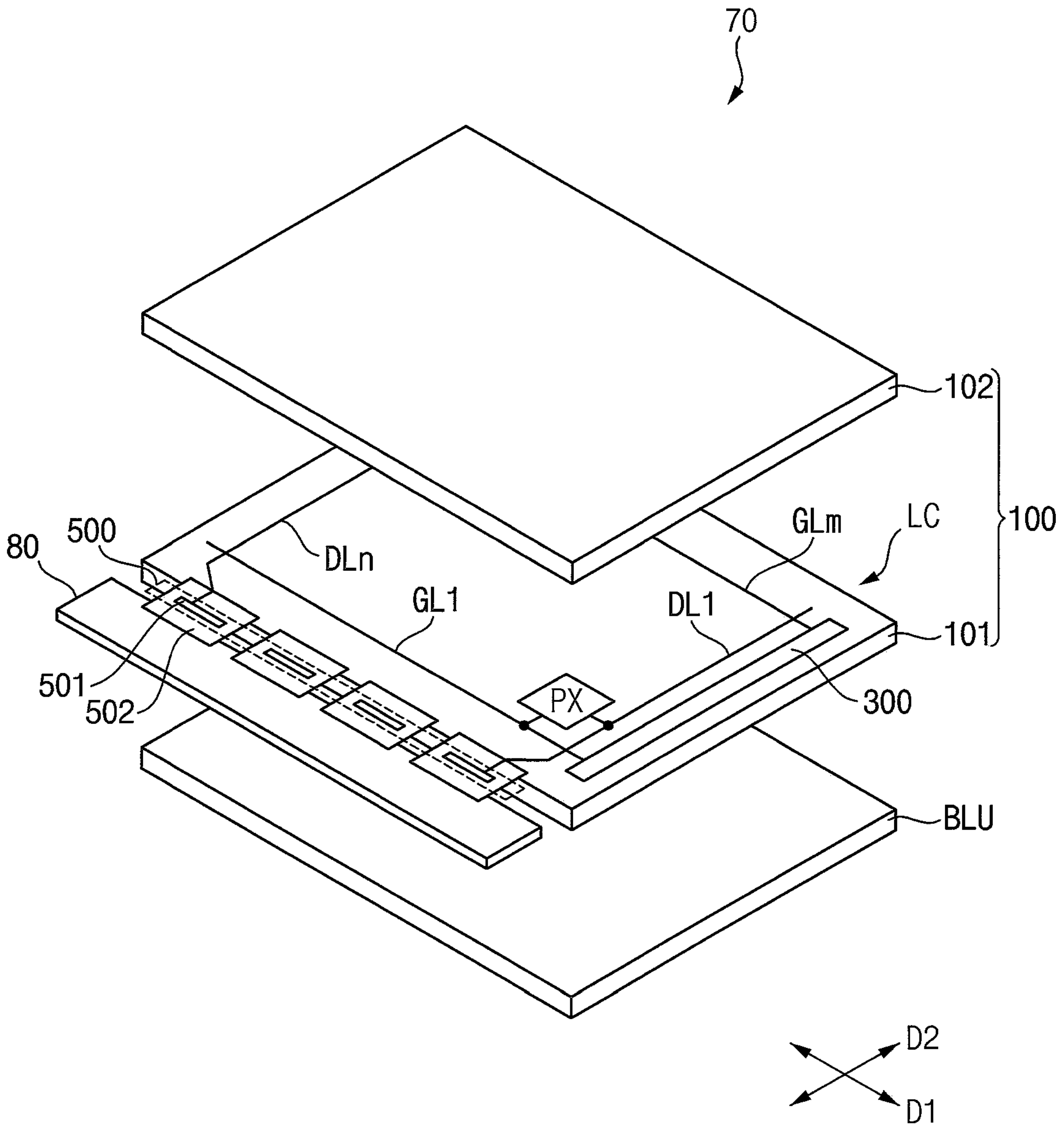
FIG. 7 is a perspective view of a display device according to example embodiments.

FIG. 7 is a perspective view of a display device according to example embodiments.

Referring to FIG. 7, a display device 70 includes a display panel 100, a gate driver GDRV 300, which may be for example a gate driving unit, a data driver DDRV 500, which may be for example a data driver, a printed circuit board 80, and a backlight BLU.

Each of the display panel 100 and the backlight BLU has a rectangular shape having short sides in a first direction D1 and long sides in a second direction D2 that crosses the first direction D1. However, the shape of each of the display panel 100 and the backlight unit BLU is not limited thereto, and may differ in other embodiments.

The backlight BLU generates light and provides the generated light to the display panel 100. The backlight BLU may include a plurality of slave driving circuits such that the slave driving circuits arranged in each driving row are connected in a daisy chain structure, as described above. The display panel 100 generates an image using the light received from the backlight BLU. The generated image is displayed to a user through an upper portion of the display panel 100.

The display panel 100 includes a first substrate 101, a second substrate 102 that faces the first substrate 101, and a liquid crystal layer LC disposed between the first substrate 101 and the second substrate 102. Each of the first substrate 101 and the second substrate 102 has a rectangular shape having short sides in the first direction D1 and long sides in the second direction D2.

A plurality of pixels PX, a plurality of gate lines GL1 to GLm, and a plurality of data lines DL1 to DLn are disposed on the first substrate 101. Here, m and n are natural numbers. Although only one pixel PX is illustrated in FIG. 7 for convenience of description, a plurality of pixels PX are disposed on the first substrate 101.

The gate lines GL1 to GLm and the data lines DL1 to DLn are insulated from each other and cross each other. The gate lines GL1 to GLm extend in the second direction D2 and are connected to the gate driver GDRV 300. The data lines DL1 to DLn extend in the first direction D1 and are connected to the data driver DDRV 500. The pixels PX are connected to the gate lines GL1 to GLm and the data lines DL1 to DLn, respectively.

The gate driver GDRV 300 is disposed on a predetermined portion of the first substrate 101 adjacent to one of the short sides of the first substrate 101. The gate driver GDRV 300 is formed in a same process as transistors of the pixels PX and then mounted on the first substrate 101 in the form of an amorphous silicon TFT gate driver circuit (ASG) or oxide semiconductor TFT gate driver circuit (OSG). However, embodiments are not limited thereto. For example, the gate driver GDRV 300 may be provided as a plurality of driving chips and mounted on flexible circuit boards and then be connected to the first substrate 101 as a tape carrier package (TCP). In embodiments, the driving chips of the gate driver GDRV 300 may be mounted on the first substrate 101 as a chip on glass (COG).

The data driver DDRV 500 includes source driving chips 501 mounted on a flexible circuit board 502. For example, although four source driving chips 501 and four flexible circuit boards 502 are illustrated in FIG. 7, embodiments are not limited thereto, the number of source driving chips 501 and the number of flexible circuit boards 502 may vary according to a size of the display panel 100 in other embodiments.

One side of each of the flexible circuit boards 502 is connected to one side of the first substrate 101. The one side of the first substrate 101 is one of the long sides of the first substrate 101. The other side of each of the flexible circuit boards 502, which is opposite to the one side of each of the flexible circuit boards 502, is connected to the printed circuit board 80. The source driving chips 501 are connected to the first substrate 101 and the printed circuit board 80 through the flexible circuit boards 502.

The timing controller as described above is disposed on the printed circuit board 80. The timing controller is mounted on the printed circuit board 80 as an integrated circuit chip. The timing controller is connected to the gate driver GDRV 300 and the data drivers DDRV 500 through the flexible circuit boards 502. The timing controller outputs a gate control signal, a data control signal, and image data.

The gate driver GDRV 300 receives the gate control signal from the timing controller and generates a plurality of gate signals in response to the gate control signal. The gate driver GDRV 300 sequentially outputs the gate signals. The gate signals are provided to the pixels PX row-by-row through the gate lines GL1 to GLm. As a result, the pixels PX are driven row-by-row.

The data driver DDRV 500 receives the image data and the data control signal from the timing controller. The data driver DDRV 500 generates and output analog data voltages that correspond to the image data in response to the data control signal. The data voltages are transmitted to the pixels PX through the data lines DL1 to DLn.

The pixels PX receive the data voltages through the data lines DL1 to DLn in response to the gate signals received through the gate lines GL1 to GLm. The pixels PX display gray scales that correspond to the data voltages. As a result, an image can be displayed.

Figure 8:
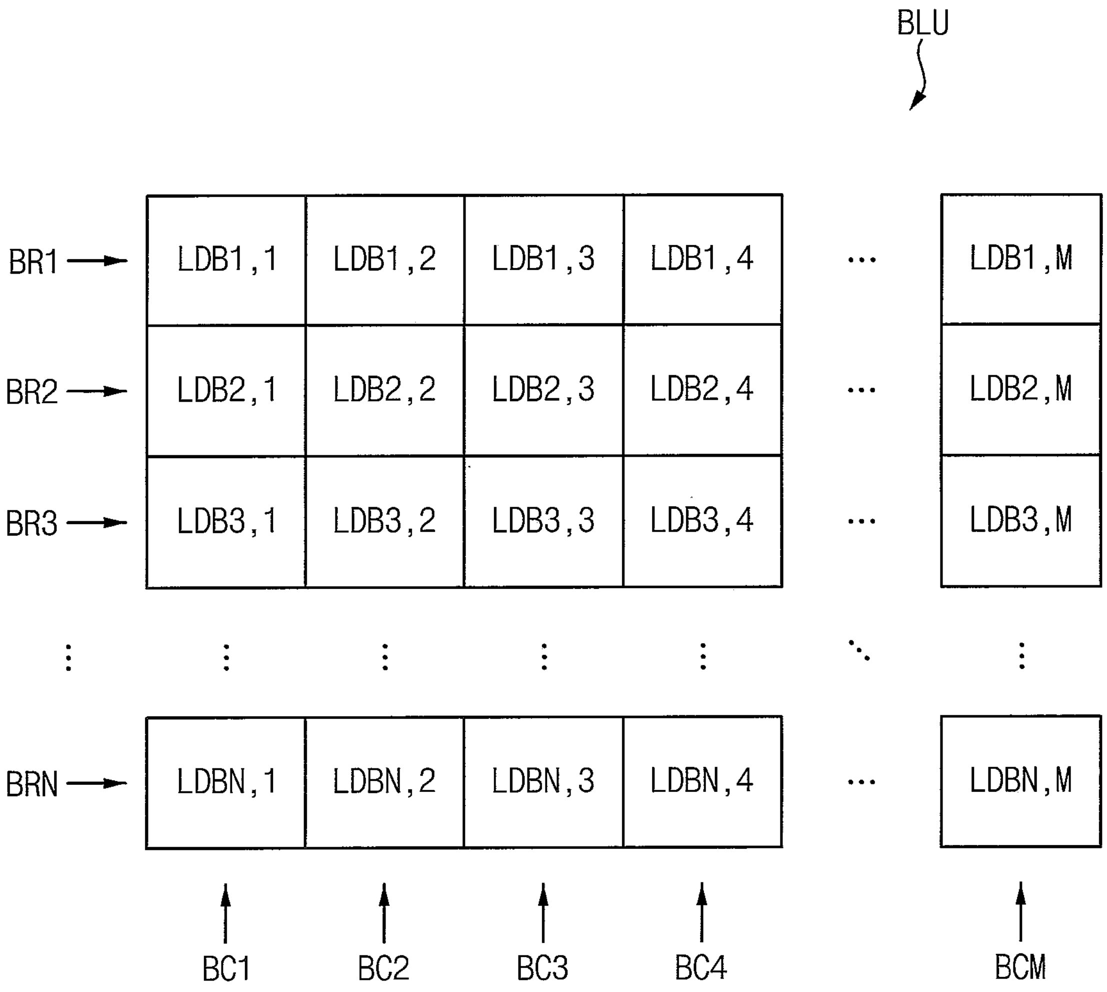
FIG. 8 is a diagram illustrating local dimming blocks included in a backlight according to example embodiments.
Figure 9:
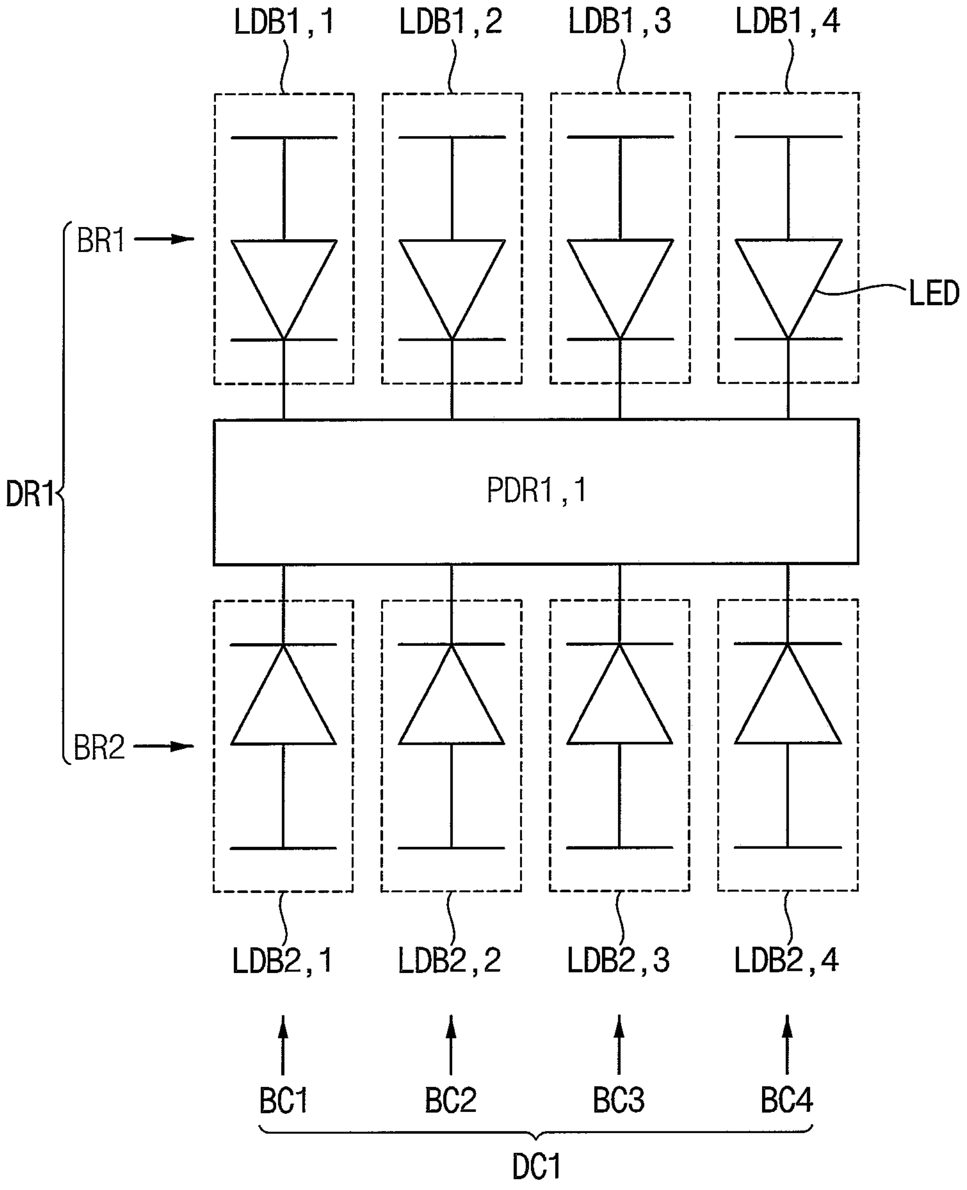
FIG. 9 is a diagram for describing relationship between a slave driving circuit and a local dimming block included in a backlight according to example embodiments.

FIG. 8 is a diagram illustrating local dimming blocks included in a backlight according to example embodiments, and FIG. 9 is a diagram for describing relationship between a slave driving circuit and a local dimming block included in a backlight according to example embodiments. FIG. 8 shows a concept of the local dimming blocks of the backlight BLU.

Referring to FIGS. 6 through 8, the light source BLU may include a plurality of local dimming blocks LDB1, 1~DLBN,M for the local dimming operation. The local dimming blocks LDB1,1~DLBN,M may be arranged in a matrix of dimming block rows BR1~BRN and dimming block columns BC1~BCM. In addition, the display panel 100 may be divided into display blocks for the local dimming operation. In some example embodiments, the local dimming blocks LDB1,1~DLBN,M in the backlight BLU may one-to-one correspond to the display blocks in the display panel 100. In embodiments, a plurality of local dimming blocks may correspond to a single display block or a plurality of display blocks may correspond to the single local dimming block.

In the local dimming method, when the grayscale data of the image displayed on the display block is high, the degree of dimming of the local dimming block corresponding to the display block may be increased. On the other hand, when the grayscale data of the image displayed on the display block is low, the degree of dimming of the local dimming block corresponding to the display block may be decreased.

Referring to FIG. 9, one slave driving circuit PDR1,1 may control a plurality of local dimming blocks LDB1, 1~LDB1,4 and LDB2,1~LDB2,4. FIG. 9 illustrates an example connection between the one slave driving circuit PDR1,1 and the corresponding local dimming blocks, and it will be understood that the other slave driving circuits have the same or similar connections, respectively.

As an example, FIG. 9 illustrates a 2*4 structure in which the eight local dimming blocks LDB1,1~LDB1,4 and LDB2,1~LDB2,4 in the two dimming block rows BR1 and the four dimming block columns BC1~BC4 are connected to the one slave driving circuit PDR1,1 in the driving row DR1 and the driving column DC1, but example embodiments are not limited thereto. The one slave driving circuit PDR1,1 may control degree of light the light sources such as LEDs included in the eight local dimming blocks LDB1, 1~LDB1,4 and LDB2,1~LDB2,4, based on the eight luminance data, respectively.

Figure 10:
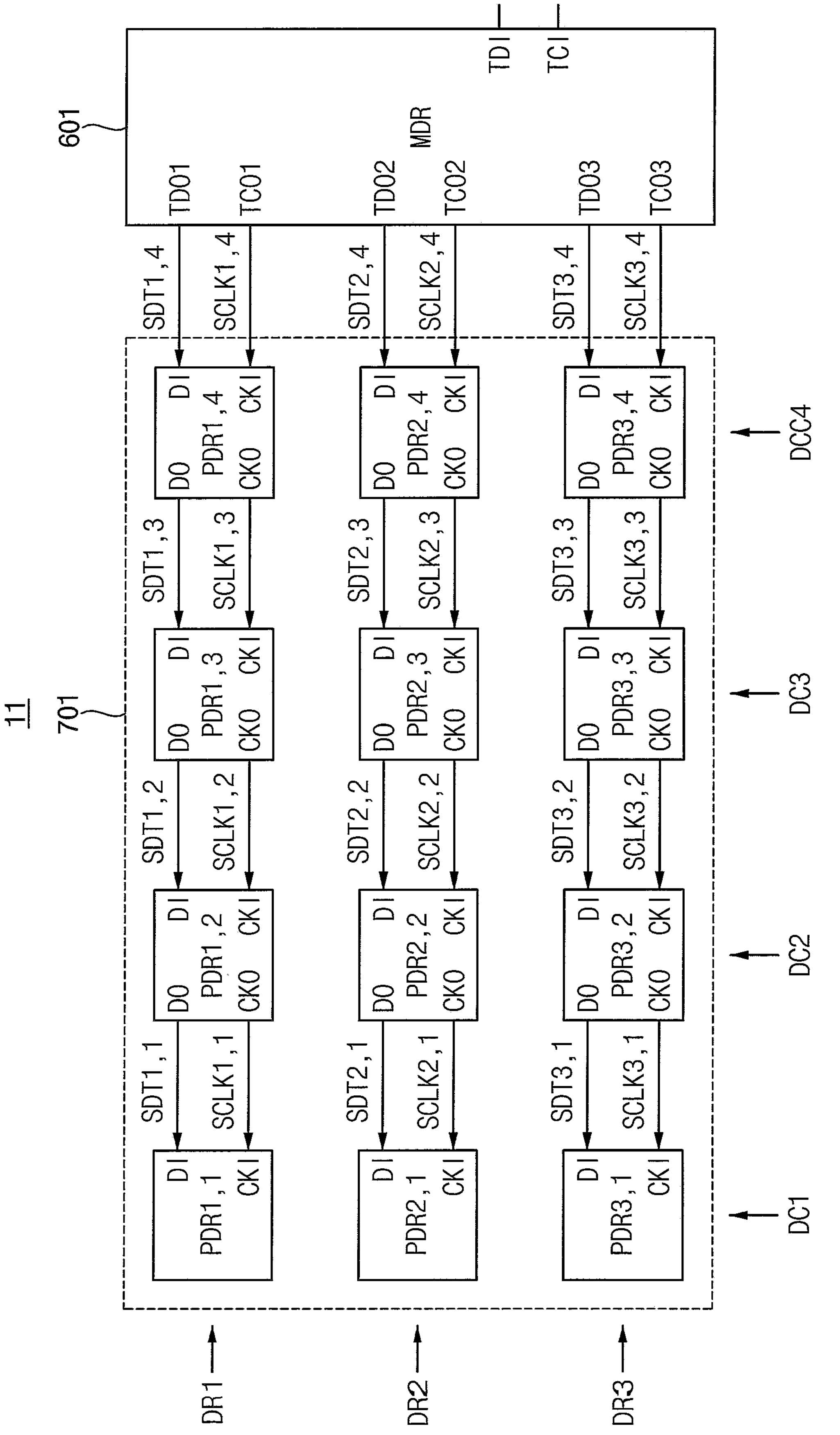
FIG. 10 and FIG. 11 are block diagrams illustrating a backlight system according to example embodiments.
Figure 11:
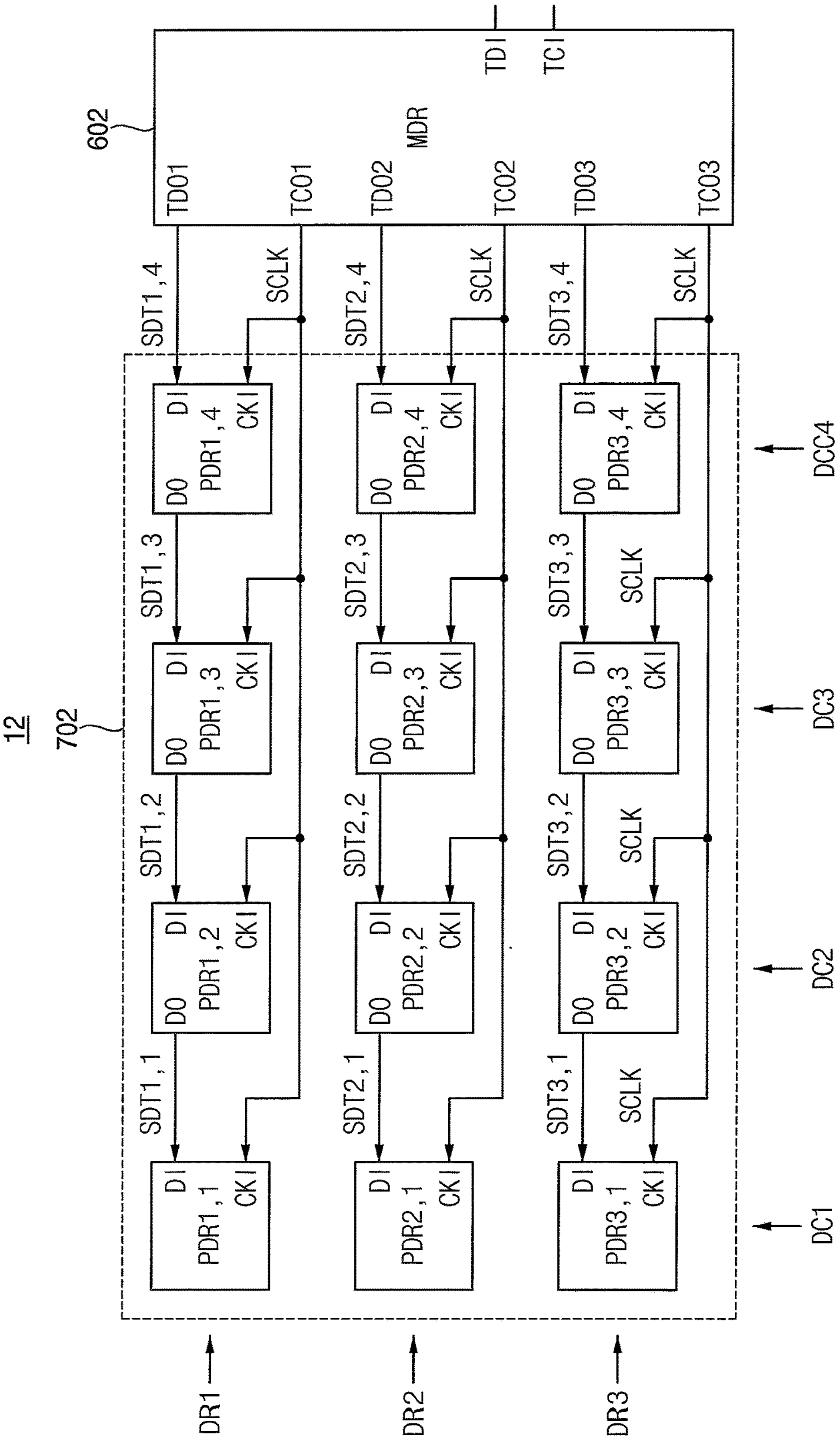

FIGS. 10 and 11 are block diagrams illustrating a backlight system according to example embodiments.

Referring to FIG. 10, a backlight system 11 may include a master driving circuit 601 and a backlight 701. In embodiments, backlight 701 may be, for example, a backlight unit. As illustrated in FIG. 10, the master driving circuit 601 may provide clock signals SCLKi,1~SCLKi,m to the first through m-th slave driving circuits PDRi,1~PDRi,m arranged in each driving row DRi by a daisy chain scheme. In other words, each slave driving circuit PDRi,j (i=1-3, j=1-4) may receive the clock signal SCKi,j from the latter stage slave driving circuit PDRi,j+1 in the same driving row DRi, and transfer the clock signal SCKi,j−1 to the former stage slave driving circuit PDRi,j−1 in the same driving row DRi. In embodiments, each slave driving circuit PDRi,j may include a retiming circuit to output the data signal SDTi,j−1 in synchronization with the clock signal SCLKi,j−1.

Referring to FIG. 11, a backlight system 12 may include a master driving circuit 602 and a backlight 702. In embodiments, backlight 701 may be, for example, a backlight unit. As illustrated in FIG. 11, the master driving circuit 602 may provide clock signals SCLKi,1~SCLKi,m to the first through m-th slave driving circuits PDRi,1~PDRi,m arranged in each driving row DRi by a multi-drop scheme.

Each slave driving circuit PDRi,j in FIG. 10 may include a data input terminal DI, a data output terminal DO, a clock input terminal CKI and a clock output terminal CKO. In contrast, each slave driving circuit PDRi,j in FIG. 11 may include a data input terminal DI, a data output terminal DO and a clock input terminal CKI and may not include a clock output terminal CKO. The multi-drop scheme may have an advantage that the number of input-output pins of the slave driving circuit may be reduced in comparison with the daisy chain scheme. In case of the multi-drop scheme, the first through m-th slave driving circuits PDRi,1~PDRi,m in each driving row DRi may operate simultaneously if the delay of the clocks signal along the clock path is neglected. The clock frequency may be limited when the number of the slave driving circuits in the same driving row is increased and thus the delay of the clock signal is increased.

The clock supply structure by the daisy chain scheme of FIG. 10 may maintain the load between the two adjacent slave driving circuits in the same driving row regardless of the length of the clock supply path. Each slave driving circuit PDRi,j may operate considering only the operations of the latter slave driving circuit PDRi,j+1 and the former slave driving circuit PDRi,j−1. Accordingly, high speed operation may be possible and the restriction of the clock frequency may be relieved. In comparison with the slave driving circuits in FIG. 11, each of the slave driving circuits in FIG. 10 requires one more pin or terminal CKO to transfer the clock signal to the former slave driving circuit.

Figure 12:
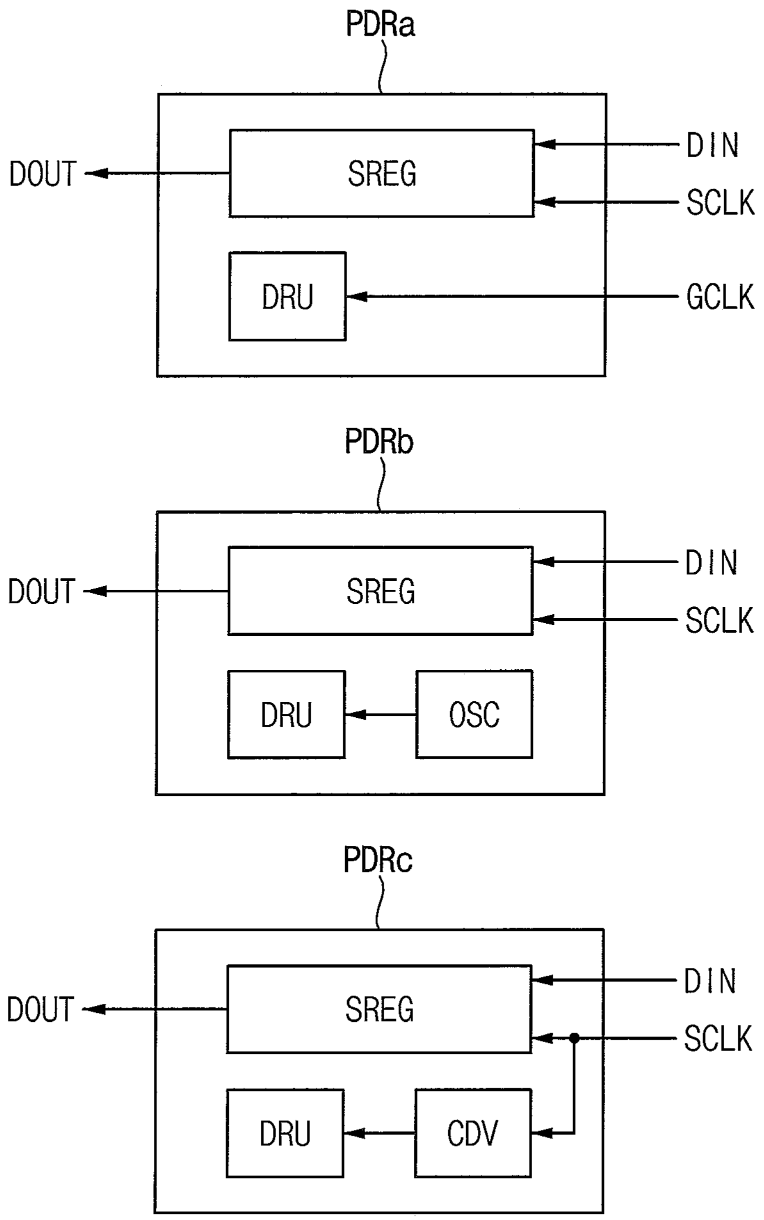
FIG. 12 is a diagram illustrating example embodiments of supplying a clock signal to a slave driving circuit included in a backlight according to example embodiments.

FIG. 12 is a diagram illustrating example embodiments of supplying a clock signal to a slave driving circuit included in a backlight according to example embodiments.

Referring to FIG. 12, a slave driving circuit PDRa of a first type may receive a clock signal SCLK for a shifting register SREG configured to transfer data DIN and DOUT and a clock signal GCLK for a driver DRU, which may be, for example, a driving unit, configured to drive a light source.

In a slave driving circuit PDRb of a second type, the shifting register SREG may operate based on the received clock signal SCLK and the driver DRU may operate based on an oscillation signal generated by an oscillator OSC.

In a slave driving circuit PDRc of a third type, both of the shifting register SREG and the driver DRU may operate based on the received clock signal SCLK. In some example embodiments, the slave driving circuit PDRc may further include a clock divider CDV configured to divide the frequency of the clock signal SCLK to provide a divided clocks signal to the driver DRU.

The slave driving circuits included in the backlight according to example embodiments may be implemented as the slave driving circuit PDRc of the third type. In other words, the shifting register SREG and the driver DRU included in each slave driving circuit may operate based on the same clock signal SCLK. In this example, a clock pin to receive the additional clocks signal GCLK may be removed, the trimming operation of the oscillator OSC is not required, the size of the slave driving circuit may be reduced, and synchronization of the entire system may be implemented conveniently using the same clock signal SCLK.

Figure 13:
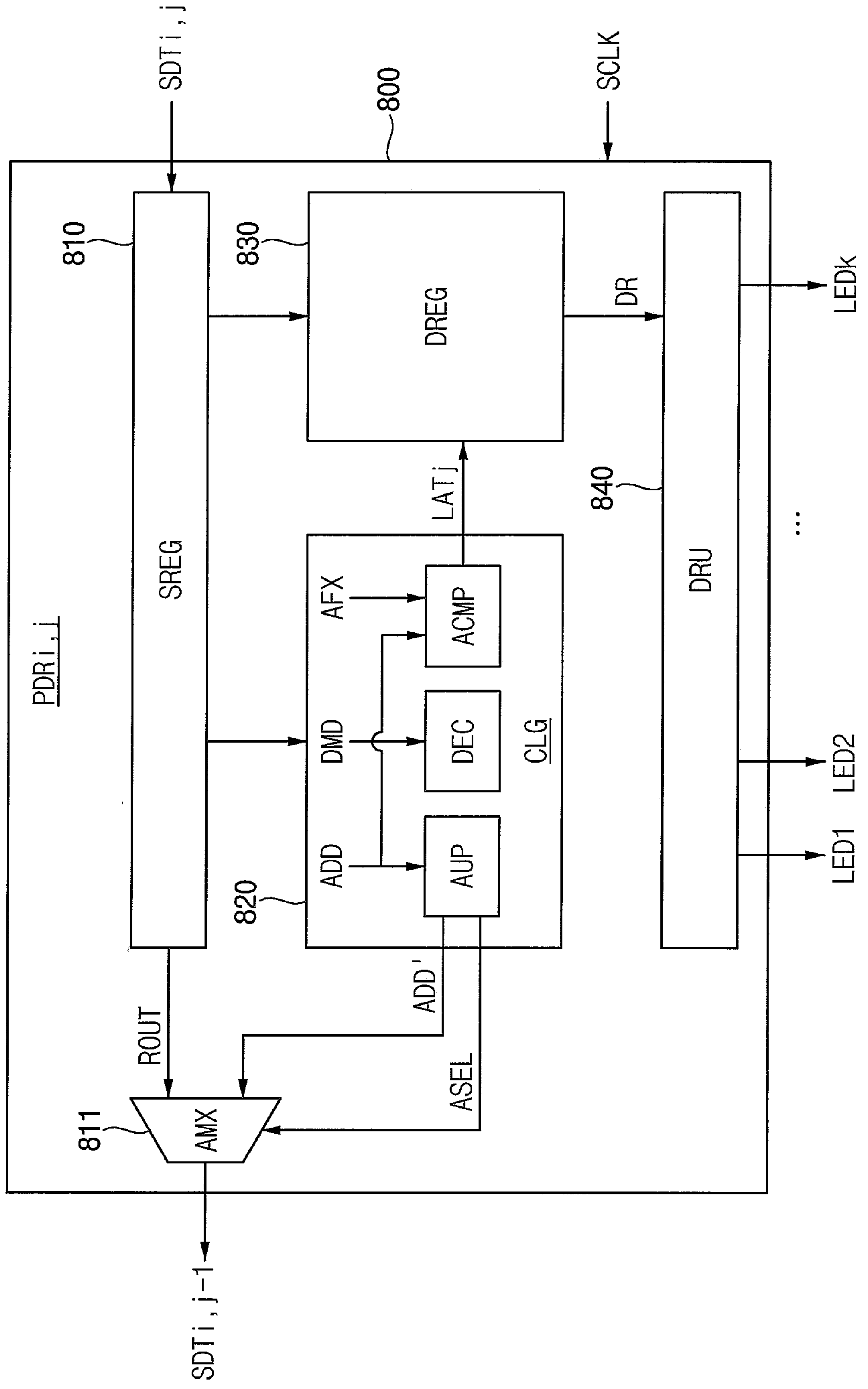
FIG. 13 is a block diagram illustrating an example embodiment of a slave driving circuit included in a backlight according to example embodiments.

FIG. 13 is a block diagram illustrating an example embodiment of a slave driving circuit included in a backlight according to example embodiments.

Referring to FIG. 13, each slave driving circuit PDRi,j 800 may include a shift register SREG 810, a control circuit CLG 820, which may be for example a control logic, a data register DREG 830 and a driver DRU 840, which may be for example a driving unit. According to example embodiments, the slave driving circuit PDRi,j 800 may further include an address selector AMX 811.

The shift register SREG 810 may store a reception packet in the data signal SDTi,j transferred from the slave driving circuit in a latter stage by bit-by-by shifting the reception packet and output the stored reception packet. The control circuit CLG 820 may generate a latch signal LATj based on a value of the virtual identifier included in the reception packet. The data register DREG 830 may latch and store the luminance data include in the reception packet based on the latch signal LATj. The driver DRU 840 may drive the light sources LED1~LEDk connected to the slave driving circuits PDRi,j 800 based on the luminance data stored in the data register DREG 830.

The control circuit CLG 820 may include an address updater AUP, a decoder DEC and an address comparator ACMP.

The address comparator ACMP may compare the value ADD of the virtual identifier of the reception packet included in the data signal SDTi,j with a fixed address AFX and activate the latch signal LATj when the value ADD of the virtual identifier of the reception packet is identical to the fixed address AFX. The data register DREG 830 may latch and store the luminance data included in the reception packet in response to activation of the latch signal LATj. The decoder may check the error of the luminance data DMD based on the parity bits PRT as described with reference to FIG. 2.

In some example embodiments, the address updater AUP in the control circuit CLG 820 may generate an updated value ADD' by increasing or decreasing the value ADD of the virtual identifier of the reception packet and generate an address selection signal ASEL that is activated while the virtual identifier of the reception packet is output from the shift register SREG 810. The address selector AMX 811 may select the updated value ADD' in response to activation of the address selection signal ASEL and select output ROUT of the shift register SREG 810 in response to deactivation of the address selection signal ASEL. As a result, the slave driving circuit PDRi,j 800 may transfer the transmission packet including the virtual identifier of the updated value ADD' instead of the received value ADD to the slave driving circuit in the former stage.

Hereinafter, example embodiments of generating the latch signal using the virtual identifier by the address comparator ACMP and storing of the luminance data by the data register DREG 830 based on the latch signal are described with reference to FIGS. 14 and 15.

Figure 14:
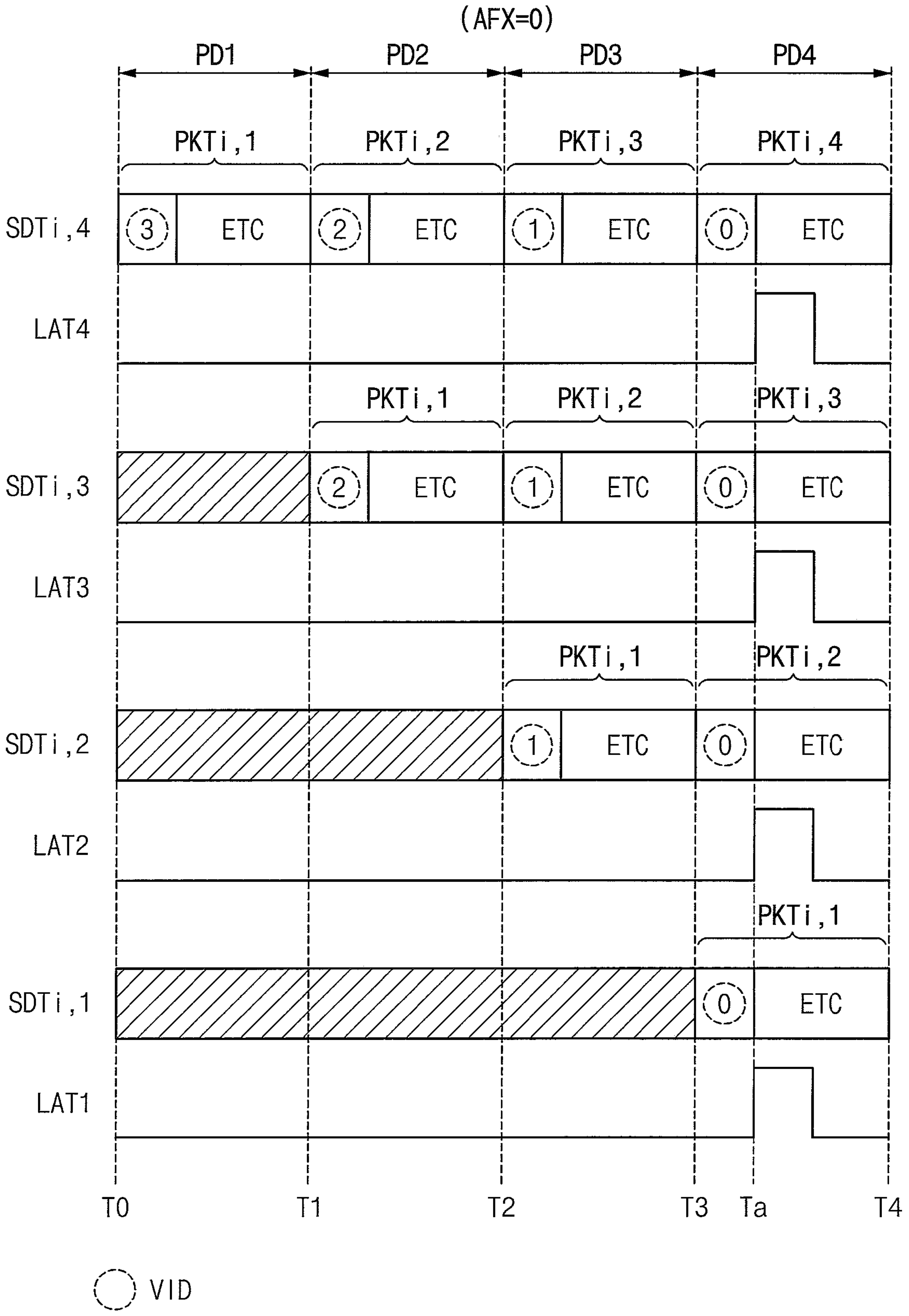
FIG. 14 and FIG. 15 are timing diagrams illustrating example embodiments of transferring a data signal in a backlight according to example embodiments.
Figure 15:
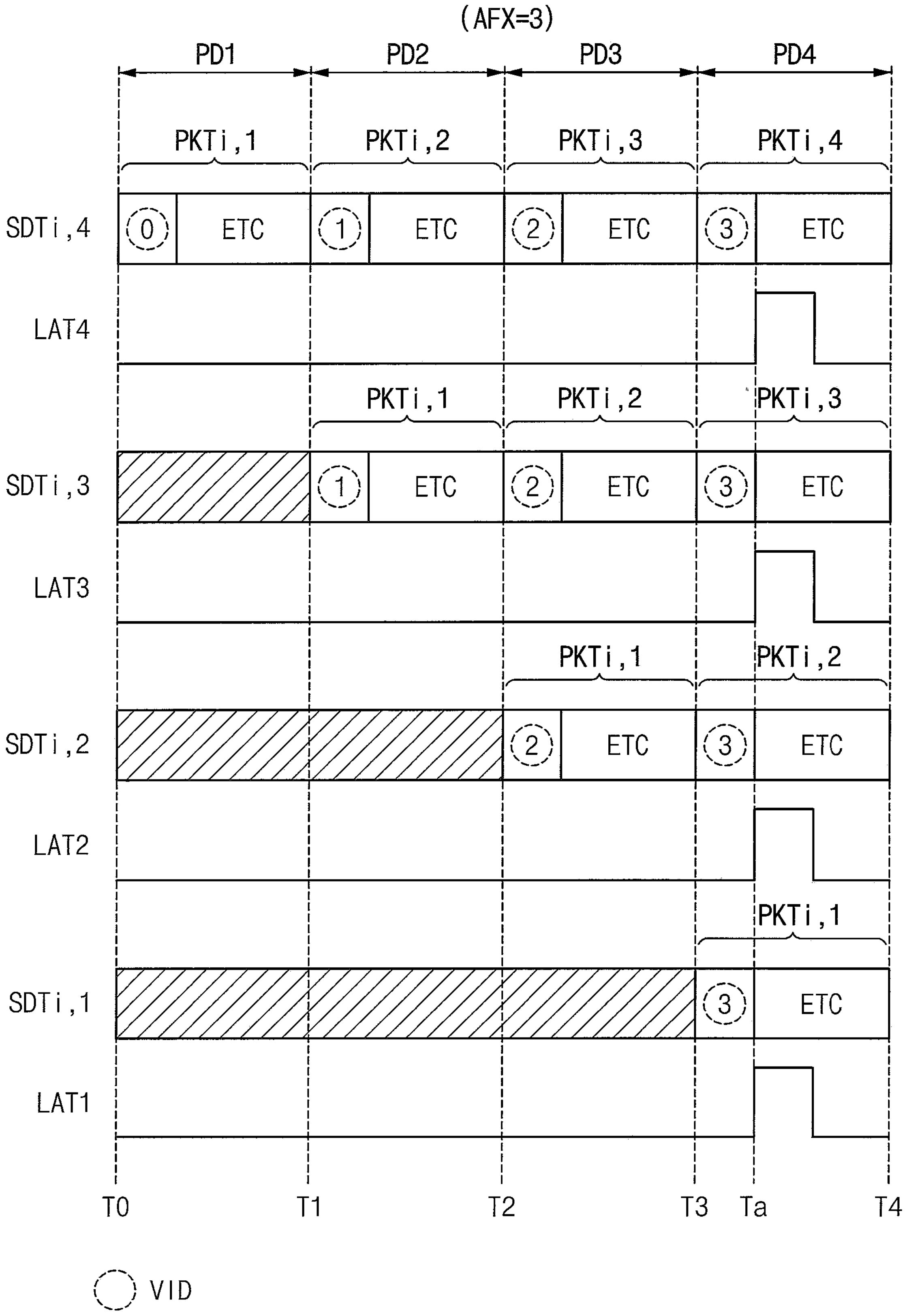

FIGS. 14 and 15 are timing diagrams illustrating example embodiments of transferring a data signal in a backlight according to example embodiments.

FIGS. 14 and 15 illustrate operations of the slave driving circuits PDRi,1~PDRi,4 in each driving row DRi as illustrated in FIGS. 10 and 11. During each of shifting periods PD1~PD4 between time points T0~T4, each slave driving circuit may store the reception packet transferred from the latter slave driving circuit and output the transmission packet corresponding to the reception packet that is received during the previous shifting period. In FIGS. 14 and 15, SDTi,4 indicates the input data signal applied to the fourth slave driving circuit PDRi,4 in the last stage, SDTi,3 indicates the data signal transferred from the fourth slave driving circuit PDRi,4 to the third slave driving circuit PDRi,3, SDTi,2 indicates the data signal transferred from the third slave driving circuit PDRi,3 to the second slave driving circuit PDRi,2, and SDTi,1 indicates the data signal transferred from the second slave driving circuit PDRi,2 to the first slave driving circuit PDRi,1.

Referring to FIG. 14, the above-described fixed address AFX may be set to be zero. The fixed address AFX may be set as the same value (e.g., the value of zero) with respect to all of the first through fourth slave driving circuits PDRi,1~PDRi,4. As described above, the master driving circuit may generate the input data signal SDTi,4 such that the values of the virtual identifiers VID in the first through fourth packets PKTi,1~PKTi,4 may be sequentially decreased by one as 3, 2, 1 and 0. Each of the first through fourth slave driving circuits PDRi,1~PDRi,4 may decrease, by one, the value of the virtual identifier VID in the reception packet transferred from the slave driving circuit in the latter stage to output the transmission packet including the virtual identifier VID of the decreased value to the slave driving circuit in the former stage.

For example, in case of the first packet PKTi,1, the fourth slave driving circuit PDRi,4 may receive the first packet PKTi,1 including the value of 3 of the virtual identifier VID during the first shifting period PD1, the third slave driving circuit PDRi,3 may receive the first packet PKTi,1 including the value of 2 of the virtual identifier VID during the second shifting period PD2, the second slave driving circuit PDRi,2 may receive the first packet PKTi,1 including the value of 1 of the virtual identifier VID during the third shifting period PD3, and the first slave driving circuit PDRi,1 may receive the first packet PKTi,1 including the value of 0 of the virtual identifier VID during the fourth shifting period PD4.

As such, the value of the virtual identifier VID may be decreased by one while passing through each slave driving circuit and all of the values of the virtual identifiers VID may be zero during the fourth shifting period PD4, with respect to the fourth packet PKTi,4 received by the fourth slave driving circuit PDRi,4, the third packet PKTi,3 received by the third slave driving circuit PDRi,3, the second packet PKTi,2 received by the second slave driving circuit PDRi,2, and the first packet PKTi,1 received by the first slave driving circuit PDRi,1.

As described above, the address comparator ACMP in the control circuit CLG 820 may compare the value of the virtual identifier VID of the reception packet included in the data signal with the fixed address AFX (e.g., zero) and activate the latch signal when the value of the virtual identifier VID of the reception packet is identical to the fixed address AFX.

As a result, the address comparators ACMP in the first through fourth slave driving circuits PDRi,1~PDRi,4 may simultaneously activate the latch signals LAT1~LAT4 at time point Ta, the data registers DREG 830 in the first through fourth slave driving circuits PDRi,1~PDRi,4 may simultaneously latch and store the corresponding luminance data in the first through fourth packets PKTi,1~PKTi,4 based on the latch signals LAT1~LAT4.

Referring to FIG. 15, the above-described fixed address AFX may be set to be three. The fixed address AFX may be set as the same value (e.g., the value of three) with respect to all of the first through fourth slave driving circuits PDRi,1~PDRi,4. As described above, the master driving circuit may generate the input data signal SDTi,4 such that the values of the virtual identifiers VID in the first through fourth packets PKTi,1~PKTi,4 may be sequentially increased by one as 0, 1, 2 and 3. Each of the first through fourth slave driving circuits PDRi,1~PDRi,4 may increase, by one, the value of the virtual identifier VID in the reception packet transferred from the slave driving circuit in the latter stage to output the transmission packet including the virtual identifier VID of the increased value to the slave driving circuit in the former stage.

For example, in case of the first packet PKTi,1, the fourth slave driving circuit PDRi,4 may receive the first packet PKTi,1 including the value of 0 of the virtual identifier VID during the first shifting period PD1, the third slave driving circuit PDRi,3 may receive the first packet PKTi,1 including the value of 1 of the virtual identifier VID during the second shifting period PD2, the second slave driving circuit PDRi,2 may receive the first packet PKTi,1 including the value of 2 of the virtual identifier VID during the third shifting period PD3, and the first slave driving circuit PDRi,1 may receive the first packet PKTi,1 including the value of 3 of the virtual identifier VID during the fourth shifting period PD4.

As such, the value of the virtual identifier VID may be increased by one while passing through each slave driving circuit and all of the values of the virtual identifiers VID may be three during the fourth shifting period PD4, with respect to the fourth packet PKTi,4 received by the fourth slave driving circuit PDRi,4, the third packet PKTi,3 received by the third slave driving circuit PDRi,3, the second packet PKTi,2 received by the second slave driving circuit PDRi,2, and the first packet PKTi,1 received by the first slave driving circuit PDRi,1.

As described above, the address comparator ACMP in the control circuit CLG 820 may compare the value of the virtual identifier VID of the reception packet included in the data signal with the fixed address AFX (e.g., zero) and activate the latch signal when the value of the virtual identifier VID of the reception packet is identical to the fixed address AFX.

As a result, the address comparators ACMP in the first through fourth slave driving circuits PDRi,1~PDRi,4 may simultaneously activate the latch signals LAT1~LAT4 at time point Ta, the data registers DREG 830 in the first through fourth slave driving circuits PDRi,1~PDRi,4 may simultaneously latch and store the corresponding luminance data in the first through fourth packets PKTi,1~PKTi,4 based on the latch signals LAT1~LAT4.

The identifiers to designate each of the slave driving circuits may be imposed through additional terminals for providing the identifiers or through an initialization operation to transfer signals such as command signals for providing the identifiers before the dimming operation. In these cases, the configuration of the slave driving circuit may become complex or the efficiency of the dimming operation may be degraded because the time of the initialization operation is increased.

In contrast, the slave driving circuit may not require the additional terminal to receive the identifier and the initialization process for imposing the identifier.

As such, the backlight system and the method of transferring luminance data according to example embodiments may reduce the size of the backlight and increase the speed of the local dimming operation by loading the luminance data to the corresponding slave driving circuit among the plurality of slave driving circuits connected in the daisy chain structure using the virtual identifier to omit configuration and operation for imposing identifiers to the slave driving circuits.

Figure 16:
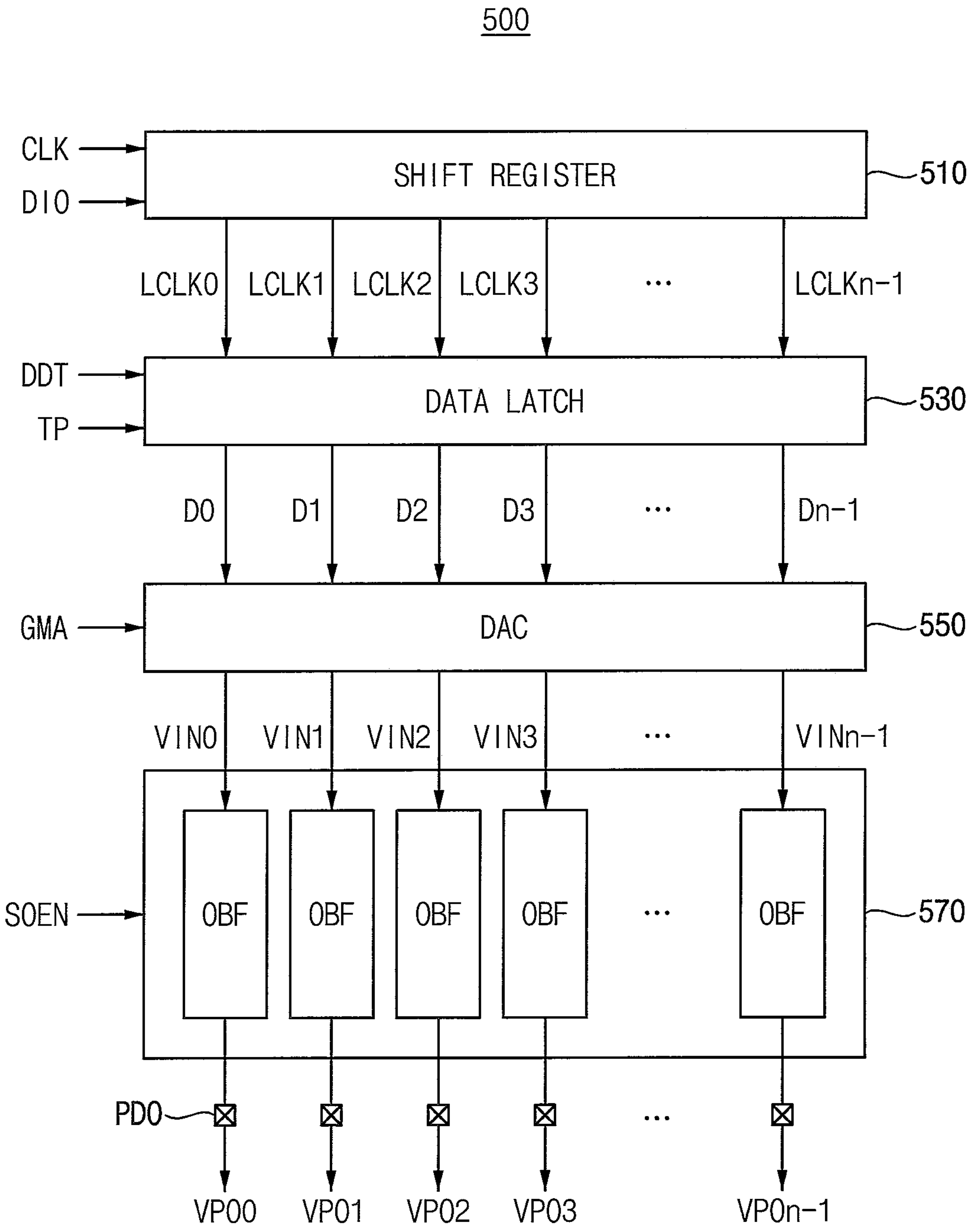
FIG. 16 is a block diagram illustrating an example embodiment of a data driver included in a display device according to example embodiments.
Figure 17:
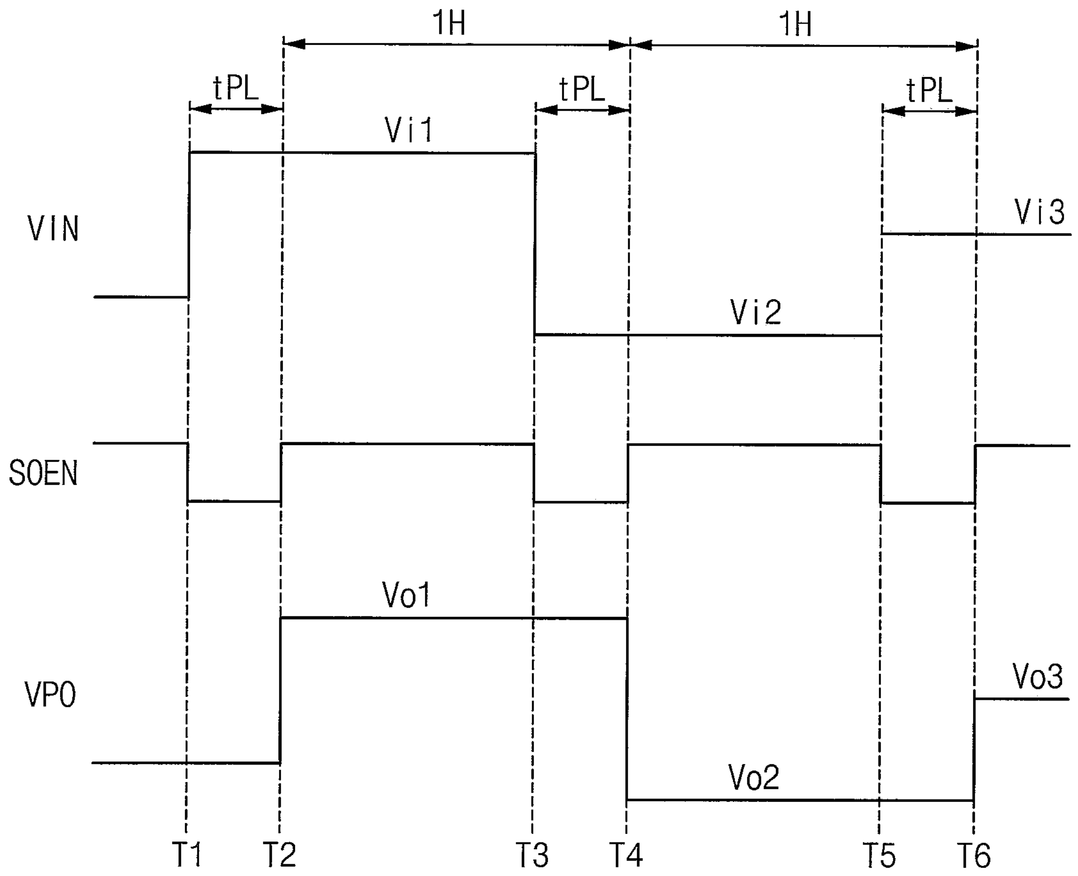
FIG. 17 is a timing diagram illustrating an operation of the data driver of FIG. 16, according to example embodiments.

FIG. 16 is a block diagram illustrating an example embodiment of a data driver included in a display device according to example embodiments, and FIG. 17 is a block diagram illustrating a source driver of a display device according to example embodiments.

Referring to FIG. 16, a data driver DDRV 500, which may be for example a source driver, may include a shift register 510, a data latch 530, a digital-to-analog converter (DAC) 550, and an output buffer block 570.

The shift register 510 may receive a clock signal CLK and an input/output control signal DIO, and may generate a plurality of latch clock signals LCLK0 to LCLKn-1 based on the clock signal CLK. Each of the latch clock signals LCLK0 to LCLKn-1 may determine a latch point in time of the data latch 530 as a clock signal of a specific period.

The data latch 530 may store data DDT in response to the latch clock signals LCLK0 to LCLKn-1 provided by the shift register 510. The data latch 530 may output the stored data to the DAC 550 in response to a load signal TP. The data latch 530 may provide output signals D0 to Dn-1 in response to the load signal TP. The DAC 550 may generate input voltage signals VIN0 to VINn-1, which are analog signals corresponding to the output signals D0 to Dn-1 of the data latch 530, using a gray voltage GMA.

The output buffer block 570 may buffer the input voltages signals VIN0 to VINn-1 and generate source driving signals, that is, the pad output voltage signals VPO0 to VPOn-1. The output buffer block 570 may include a plurality of output buffer circuits OBF respectively driving the source lines (or the data lines) of the display panel.

Referring to FIG. 17, according to transitions of the voltage levels Vi1, Vi2 and Vi3 of the input voltage signal VIN, the voltage levels Vo1, Vo2 and Vo3 of the pad output voltage signal VPO may transition sequentially per unit period 1H. When the output buffer circuit is the source amplifier circuit included in a source driver of a display device, the unit period 1H may correspond to a row scan period for applying the source voltage or the pad output voltage signal VPO to each pixel of a selected row.

The output enable signal SOEN may be deactivated during a pre-latch period tPL corresponding to a second portion of the unit period 1H and may be activate during an output period corresponding to a first portion of the unit period 1H. FIG. 17 illustrates an example that the output enable signal SOEN and the inversion signal SOENB are activated in the logic high level, but the activation logic level is not limited thereto.

The transfer of the luminance data as described above may be performed during the pre-latch period tPL. The latch operation of the data driver DDRV 500, which may be for example a source driver, and the transfer of the luminance data of the backlight system may be performed during the pre-latch period tPL in advance, and the data driver DDRV 500 and the backlight may commonly use the output enable signal SOEN and the synchronization between the display image by the pixels and the local dimming operation of the light sources may be implemented conveniently.

Figure 18:
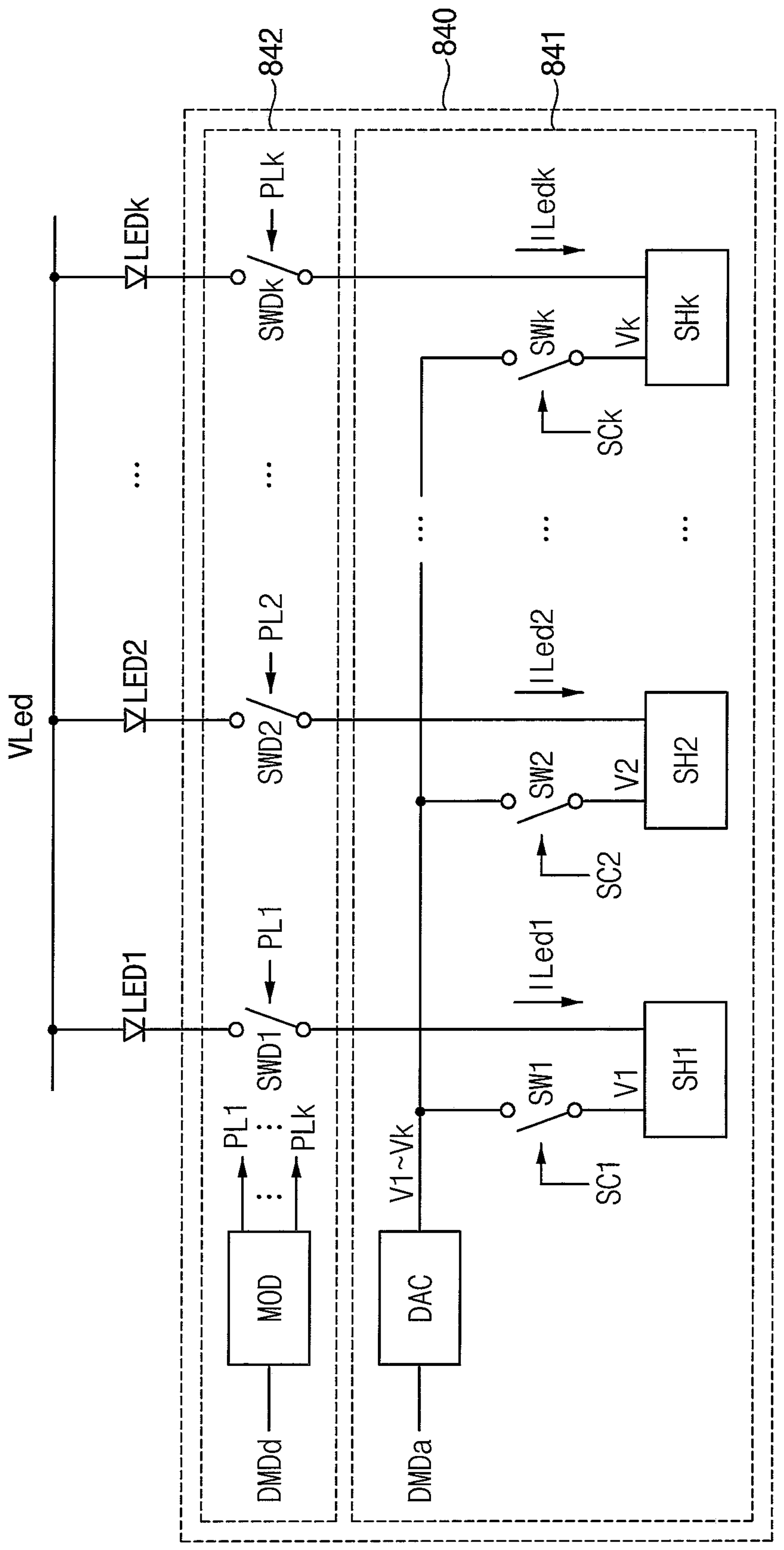
FIG. 18 is a diagram illustrating an example embodiment of a driver included in a slave driving circuit of a backlight according to example embodiments.
Figure 19:
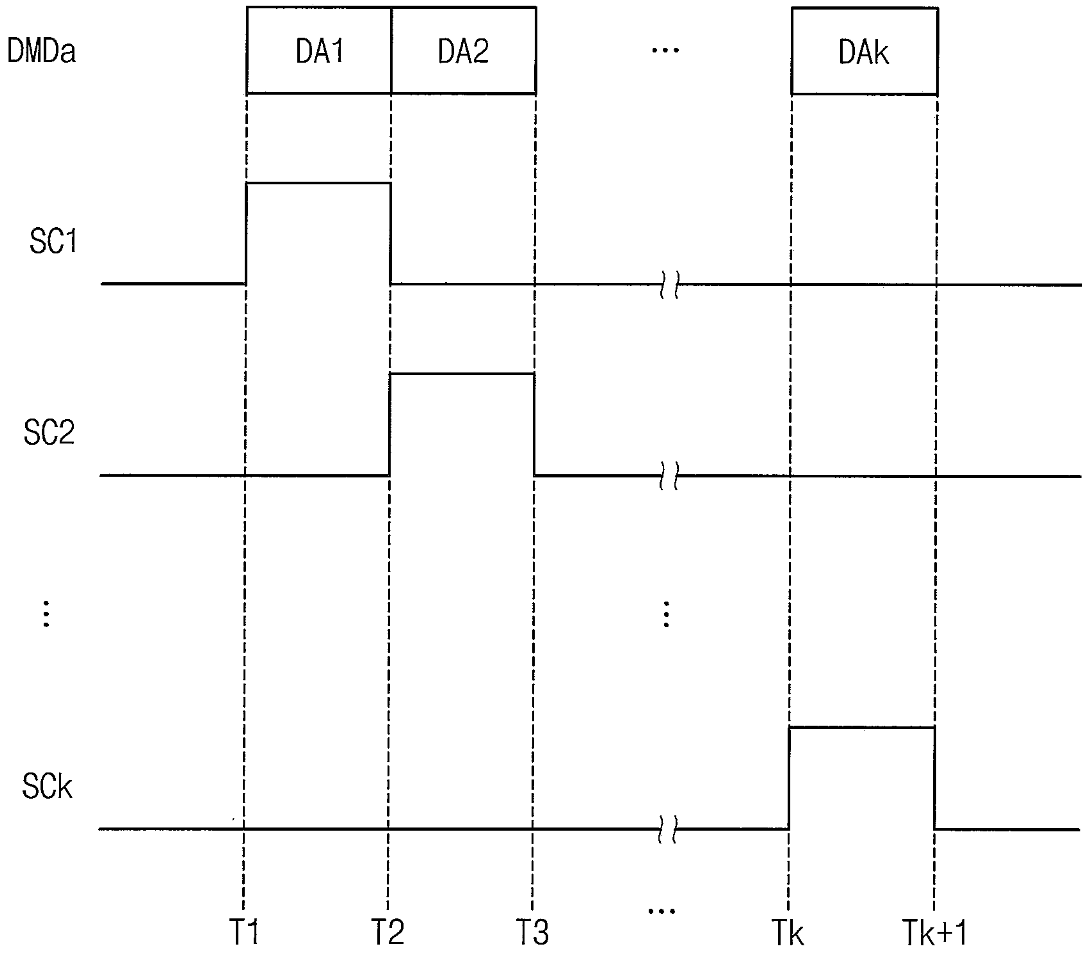
FIG. 19 is a timing diagram illustrating an operation of an analog driver included in the driver of FIG. 18, according to example embodiments.

FIG. 18 is a diagram illustrating an example embodiment of a driver included in a slave driving circuit of a backlight according to example embodiments, and FIG. 19 is a timing diagram illustrating an operation of an analog driver included in the driver of FIG. 18.

Referring to FIG. 18, a driver DRU 840 may include an analog driver 841 and a digital driver 842, which may be, for example, driving units. Also a plurality of light sources LED1~LEDk connected to a light source voltage VLed and driven by one slave driving circuit are illustrated in FIG. 18.

Each packet as described above may include luminance data corresponding to each of the light sources LED1~LEDk, and each luminance data may include first digital data DMDa for analog driving and second digital data DMDd for digital driving. For example, each luminance data corresponding to each light source may be 20-bit data such that the first digital data DMDa are eight bits and the second digital data DMDd are twelve bits.

The analog driver 841 may include a digital-to-analog converter DAC and sampling and holding circuits SH1~SHk. The digital-to-analog converter DAC may convert the values of the first digital data DMDa of the luminance data stored in the data register to sequentially output voltages V1~Vk corresponding to the values of the first digital data DMDa. The sampling and holding circuits SH1~SHk may store the voltages V1~Vk and provide driving currents ILed1~ILedk to the light sources LED1~LEDk connected to each slave driving circuit based on the voltages V1~Vk.

The digital driver 842 may include a modulator MOD and dimming switches SWD1~SWDk. The modulator MOD may generate pulse signals PL1~PLk based on the values of the second digital data DMDd of the luminance data. In some example embodiments, the modulator MOD may perform a pulse width modulation (MOD) to convert the values of the second digital data DMDd to pulse widths of the pulse signals PL1~PLk. FIG. 18 illustrates an example of the digital driver 842 and example embodiments are not limited to the specific configuration of the digital driver 842.

Referring to FIGS. 18 and 19, switches SW1~SWk included in the analog driver 841 may be turned on based on switch control signals SC1~SCk provided from the control circuit CLG 820 in FIG. 13. The switch control signals SC1~SCk may be activated sequentially at time points T1~Tk+1, at which the values DA1~DAk of the first digital data DMDa are provided to the digital-to-analog converter DAC, and the switches SW1~SWk may be turned on sequentially. Accordingly the voltages V1~Vk corresponding to the values DA1~DAk may be stored in the sampling and holding circuits SH1~SHk at various time points, respectively.

Figure 20:
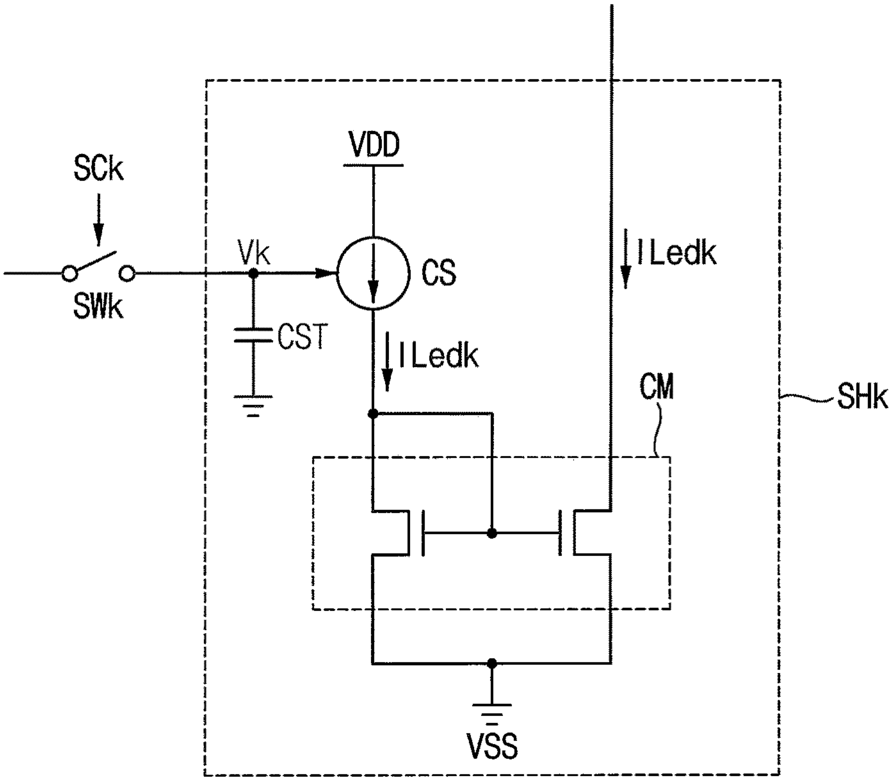
FIG. 20 is a circuit diagram illustrating an example embodiment of a sampling and holding circuit included in the driver of FIG. 18.

FIG. 20 is a circuit diagram illustrating an example embodiment of a sampling and holding circuit included in the driver of FIG. 18.

Referring to FIG. 20, each sampling and holding circuit SHk may include a capacitor CST, a current source CS and a current mirror CM. The capacitor CST may store the voltage Vk applied through the switch SWk that is turned on in response to activation of the switch control signal SCk. As described above, the voltage Vk has a level corresponding to the value DAk of the first digital data DMDa. The current source CS connected to a power supply voltage VDD may generate the driving current ILedk corresponding to the voltage Vk and provide the driving current ILedk to the current mirror CM. The current mirror CM connected to a ground voltage VSS may copy the driving current ILedk and provide the copied driving current ILedk to the light source LEKk in FIG. 18. Example embodiments are not limited to the specific configuration of FIG. 20, and the configuration of the sampling and holding circuit may be implemented variously.

A conventional driver includes a plurality of digital-to-analog converters corresponding to the number of the light sources LED1~LEDk to respectively generate the driving currents ILed1~ILedk. In this case, the size and the power consumption may be increased as the number of the light sources LED1~LEDk is increased.

As described with reference to FIG. 18 through 20, the driver DRU 840 may include the one common digital-to-analog converter DAC regardless of the number of the light sources LED1~LEDk. Accordingly the driver DRU 840 according to example embodiments may have reduced size and power consumption in comparison with the conventional driver.

Figure 21:
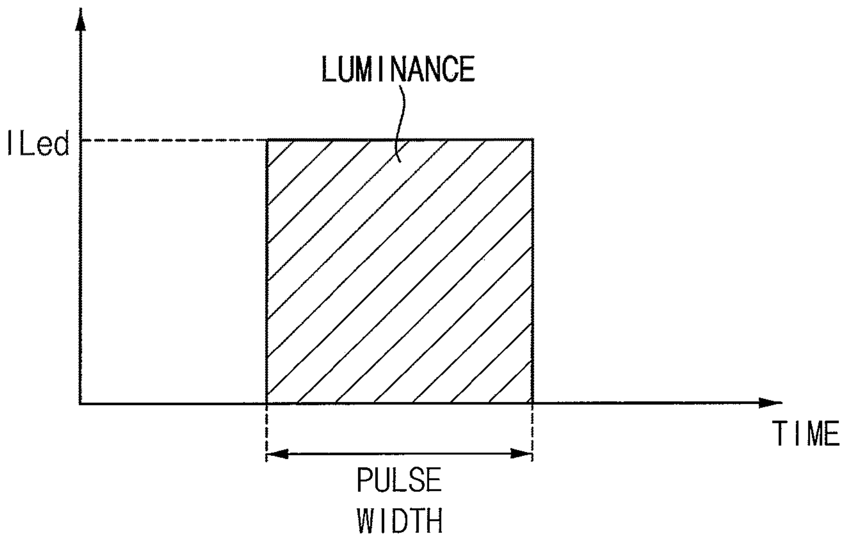
FIG. 21 is a diagram illustrating luminance implemented by the driver of FIG. 18, according to example embodiments.

FIG. 21 is a diagram illustrating luminance implemented by the driver of FIG. 18.

Referring to FIG. 21, the luminance of the light source may be represented by a multiplication of a pulse width and a current ILed. The pulse width corresponds to the pulse width of each of the pulse signals PL1~PLk in FIG. 18 and the pulse width may be determined based on each value of the second digital data DMDd for digital driving. The current ILed corresponds to each of the driving current ILed1~ILedk in FIG. 18 and the current ILed may be determined based on each value of the first digital data DMDa for analog driving.

Figure 22:
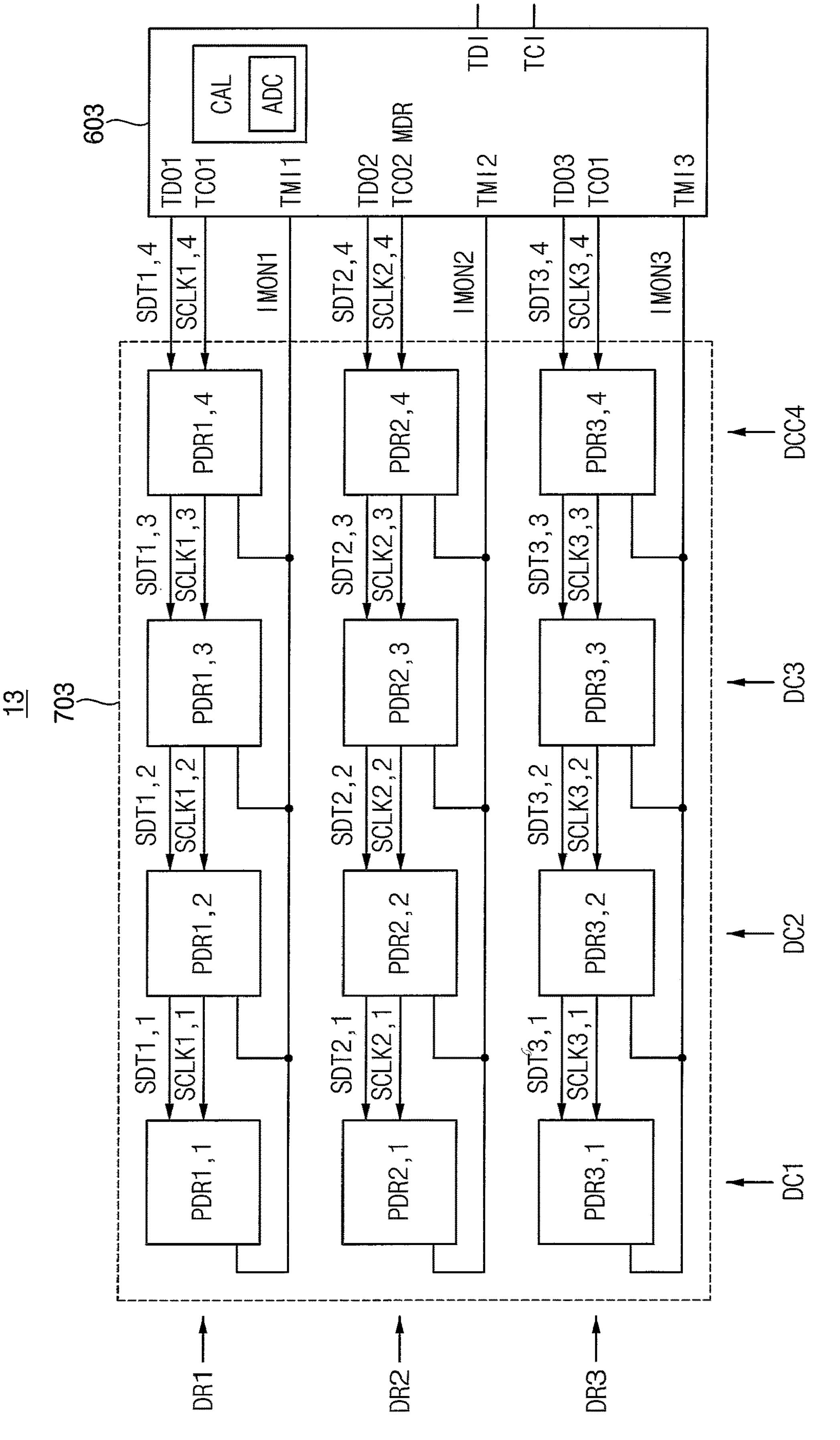
FIG. 22 is a block diagram illustrating a backlight system according to example embodiments.
Figure 23:
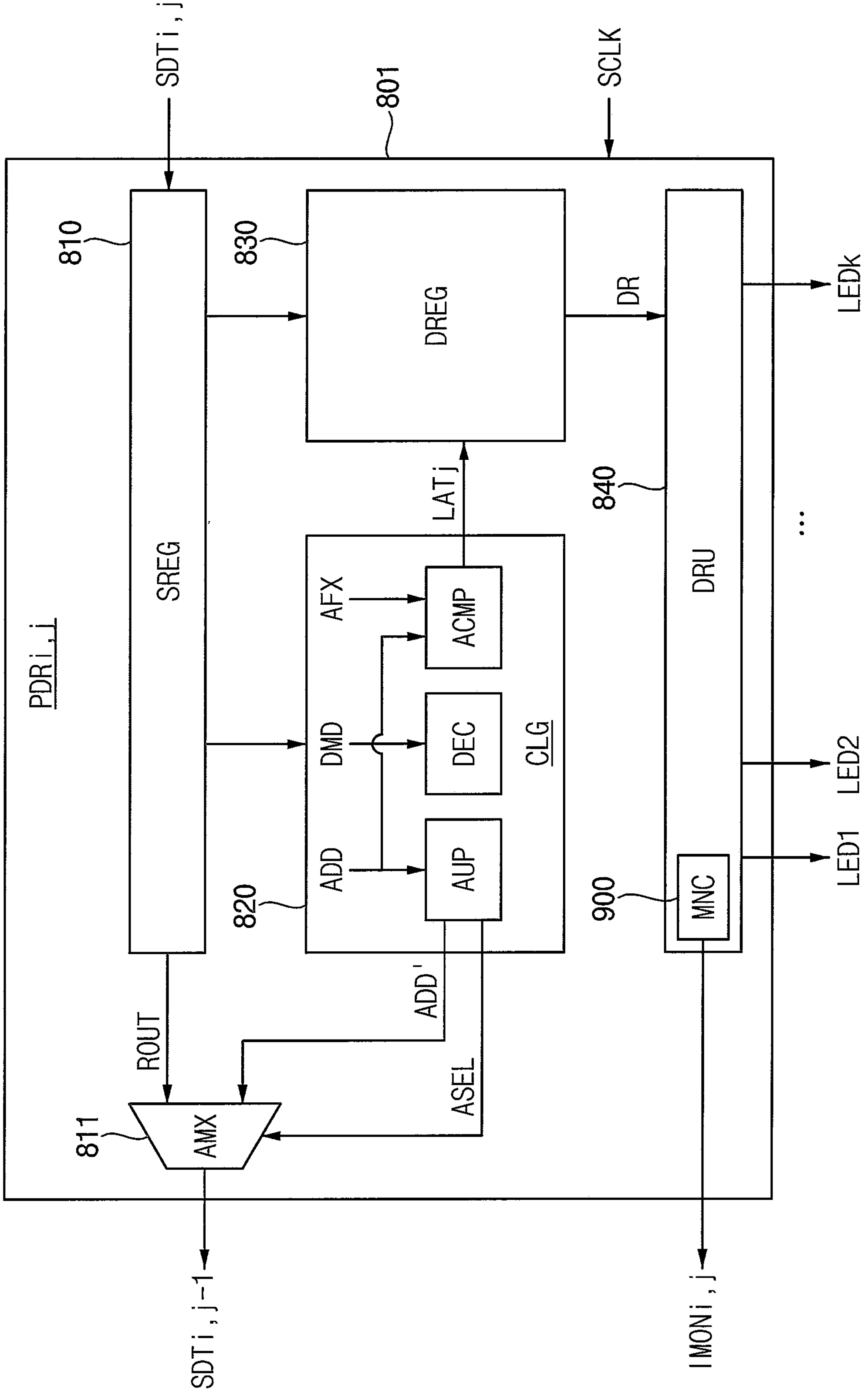
FIG. 23 is a block diagram illustrating an example embodiment of a slave driving circuit included in a backlight in FIG. 22.

FIG. 22 is a block diagram illustrating a backlight system according to example embodiments, and FIG. 23 is a block diagram illustrating an example embodiment of a slave driving circuit included in a backlight in FIG. 22.

A backlight system 13 and a slave driving circuit 801 of FIGS. 22 and 23 are substantially similar to the backlight system 11 and the slave driving circuit 800 of FIGS. 10 and 13, and thus repeated descriptions are omitted.

Referring to FIGS. 22 and 23, each slave driving circuit PDRi,j may further include a monitoring circuit MNC 900 configured to generate a current IMONi,j. The first through fourth slave driving circuits PDRi,1~PDRi,4 in each driving row DRi may generate a monitoring current IMONi as will be described below with reference to FIGS. 24 and 25 and provide the monitoring current IMONi to a monitoring terminal TMIi of the master driving circuit 603.

Figure 24:
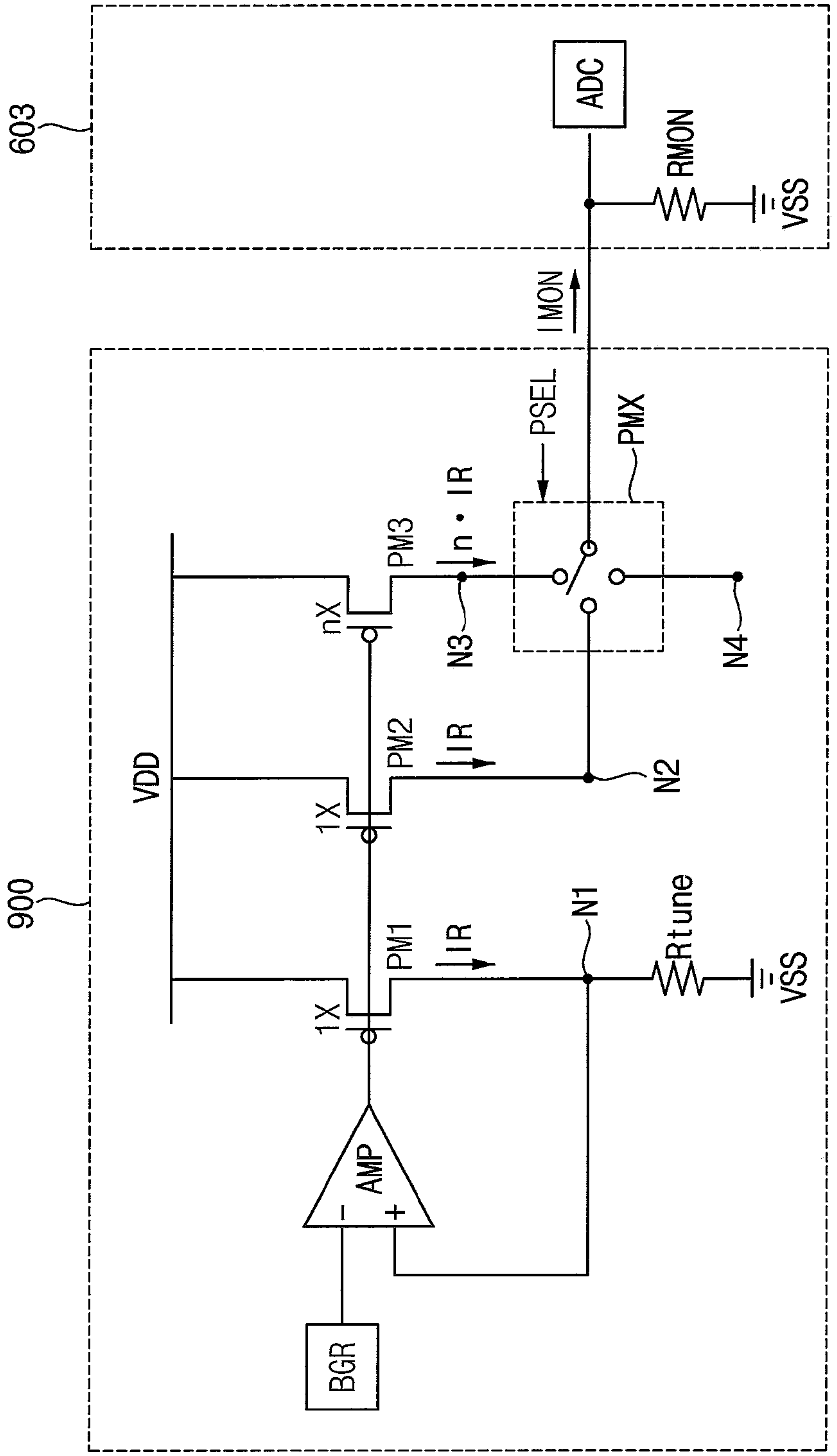
FIG. 24 is a circuit diagram illustrating a monitoring circuit included in the slave driving circuit of FIG. 23, according to example embodiments.
Figure 25:
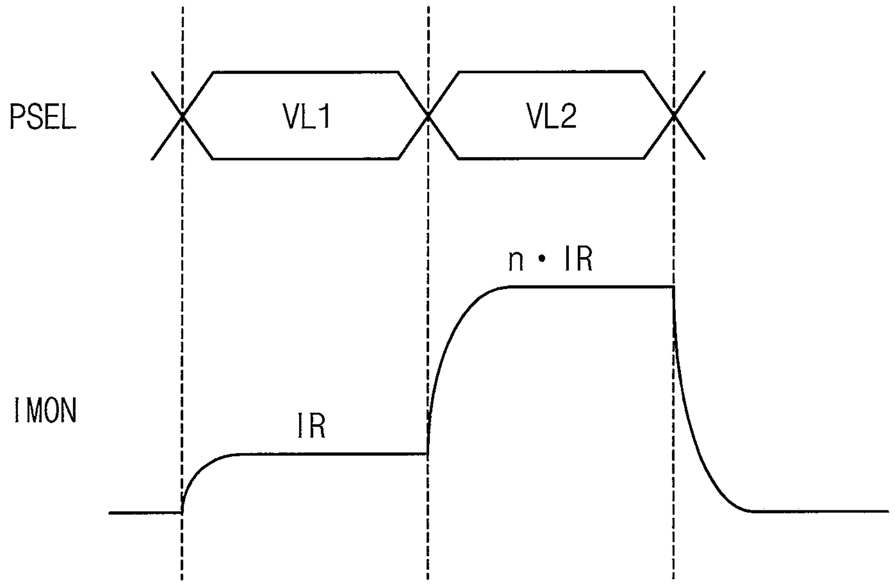
FIG. 25 is a timing diagram illustrating an operation of the monitoring circuit of FIG. 24, according to example embodiments.

FIG. 24 is a circuit diagram illustrating a monitoring circuit included in the slave driving circuit of FIG. 23, and FIG. 25 is a timing diagram illustrating an operation of the monitoring circuit of FIG. 24.

Referring to FIG. 24, the monitoring circuit MNC 900 may include a band gap reference circuit BGR, an amplifier AMP, a plurality of transistors PM1, PM2 and PM3, a resistor Rtune and a path selector PMX.

The band gap reference circuit BGR may generate a reference voltage having a uniform voltage level regardless of operational conditions. The amplifier AMP and the transistor PM1 form a negative feedback loop and an output voltage of the amplifier may track the reference voltage from the band gap reference circuit BGR. As a result, a reference current IR flowing through the resistor Rtune from the power supply voltage VDD to the ground voltage VSS may have a uniform magnitude corresponding to the reference voltage.

The output voltage of the amplifier AMP may be applied commonly to the gate electrodes of the transistors PM1, PM2 and PM3. In some example embodiments, the size nX of the transistor PM3 may be n times the size 1X of the transistors PM1 and PM2. In this case, the reference current IR may be generated through the drain of the transistor PM2 and the amplified current nIR that is n times the reference current IR may be generated through the drain of the transistor PM3.

The path selector PMX may generate a monitoring current IMON based on a path control signal PSEL provided from the control circuit CLG 820 in FIG. 13. For example, as illustrated in FIG. 25, the path control signal PSEL may sequentially have a first value VL1 and a second value VL2. When the path control signal PSEL has the first value VL1, the path selector PMX may be connected to the drain of the transistor PM2 to provide the reference current IR as the monitoring current IMON. When the path control signal PSEL has the second value VL2, the path selector PMX may be connected to the drain of the transistor PM3 to provide the amplified current nIR, which is n times the reference current IR, as the monitoring current IMON. A termination resistor RMON may be connected between the ground voltage VSS and the monitoring terminal of the master driving circuit 603.

As such, each slave driving circuit may perform correlated double sampling to sample the reference current IR and the amplified current nIR.

The master driving circuit 603 in FIG. 22 may include a calibration circuit CAL to compensate for operational deviations of the plurality of slave driving circuits based on the monitoring currents from the monitoring circuits in the plurality of slave driving circuits. The calibration circuit CAL may include an analog-to-digital converter ADC configured to convert a plurality of monitoring current to a plurality of digital values, where each monitoring current is provided from the monitoring circuit included in each of the plurality of slave driving circuits. Each monitoring current IMONi (i=1, 2, 3) may sequentially include currents that are respectively sampled by the first through fourth slave driving circuits PDRi,1~PDRi,4 in each driving row DRi The calibration circuit CAL in the master driving circuit 603 may compensate for the operational deviations based on the difference nIR-IR between the reference current IR and the amplified current nIR by the correlated double sampling. The effects by the external noises may be reduced through the correlated double sampling and the operational deviations of the slave driving circuits may be compensated exactly.

Figure 26A:
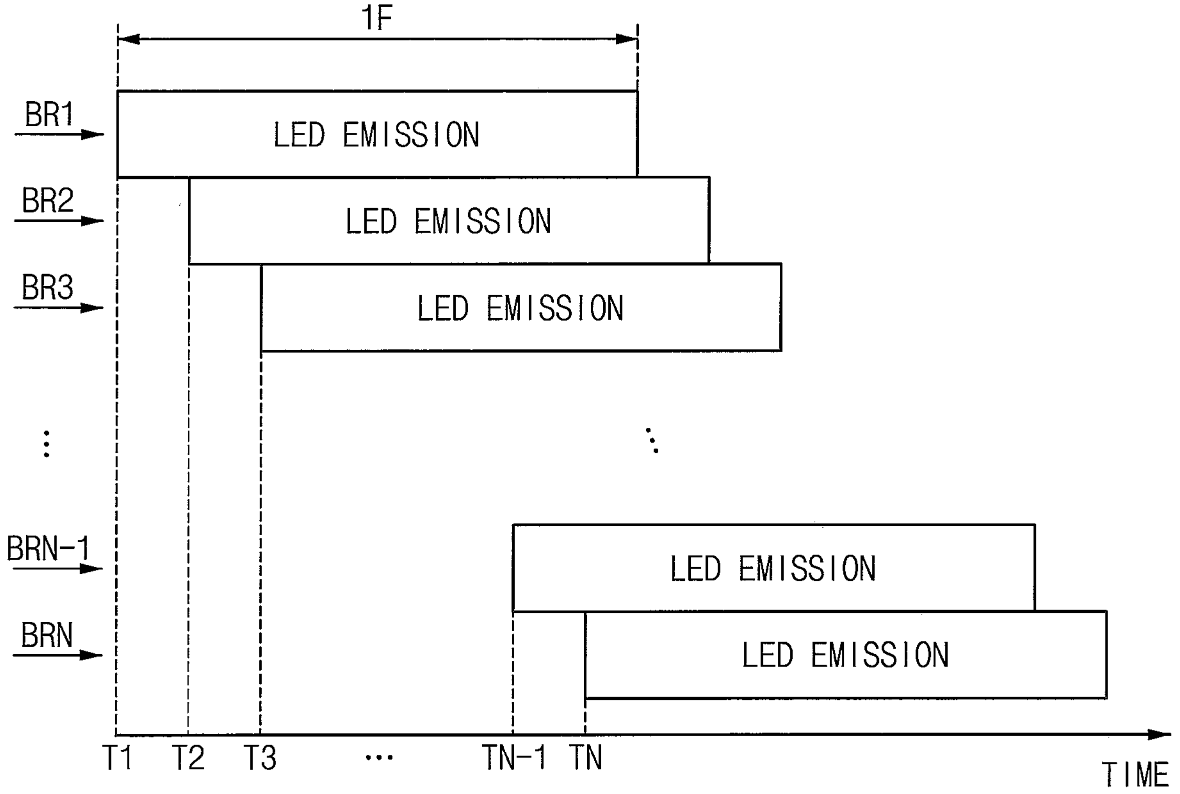
FIG. 26A and FIG. 26B are diagrams illustrating an example embodiment of a dimming operation in a backlight system according to example embodiments.
Figure 26B:
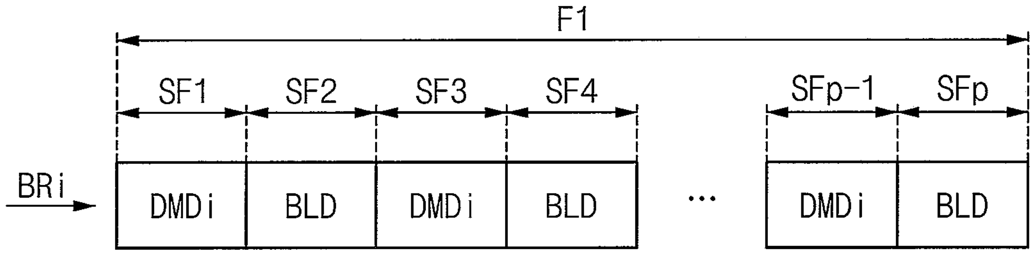

FIGS. 26A and 26B are diagrams illustrating an example embodiment of a dimming operation in a backlight system according to example embodiments.

As described with reference to FIG. 8, the backlight system BLU may include the plurality of local dimming blocks LDB1,1~LDBN,M. The local dimming blocks LDB1,1~DLBN,M may be arranged in the matrix of the dimming block rows BR1~BRN and the dimming block columns BC1~BCM.

Referring to FIG. 26A, the dimming operation may be performed by unit of dimming block row with respect to the plurality of dimming block rows BR1~BRN. For example, the LED emission for the first dimming block row BR1 may be performed during the one frame period 1F from the first time point T1, the LED emission for the second dimming block BR2 row may be performed during the one frame period 1F from the second time point T2, and in this way the LED emission for the N-th dimming block row BRN may be performed during the one frame period 1F from the N-th time point TN.

The luminance data may be transferred to the slave driving circuits by a frame rate (e.g., 60 Hz or 120 Hz) of a display device and the transferred luminance data may be used for the one frame period 1F corresponding to an inverse of the frame rate.

FIG. 26B illustrates a black sub-frame insertion (BSFI) operation corresponding to the dimming operation for each dimming block row BRi during the one frame period 1F.

Referring to FIG. 26B, the one frame period 1F may be divided into a plurality of sub frames SF1~SFp. For example, the one frame period 1F may be divided into twelve sub frames SF1~SF12.

The slave driving circuits in each dimming block row BRi may drive the corresponding light sources based on the corresponding luminance data DMDi during a first portion of the sub frames SF1~SFp and based on black data BLD during a second portion of the sub frames SF1~SFp. The black data BLD indicate the data that the luminance of the light from the light source is zero.

For example, as illustrated in FIG. 26B, the slave driving circuits may drive the light sources based on the luminance data DMDi during the odd-numbered sub frames SF1, SF3 and SFp-1 and based on black data BLD during the even-numbered sub frames SF2, SF4 and SFp. In other words, the real dimming and the black dimming may be performed alternately.

As such, an effect of inserting a black frame may be achieved by applying the black dimming for a portion of the sub frames, and the afterimage phenomenon in the display device may be relieved.

Figure 27:
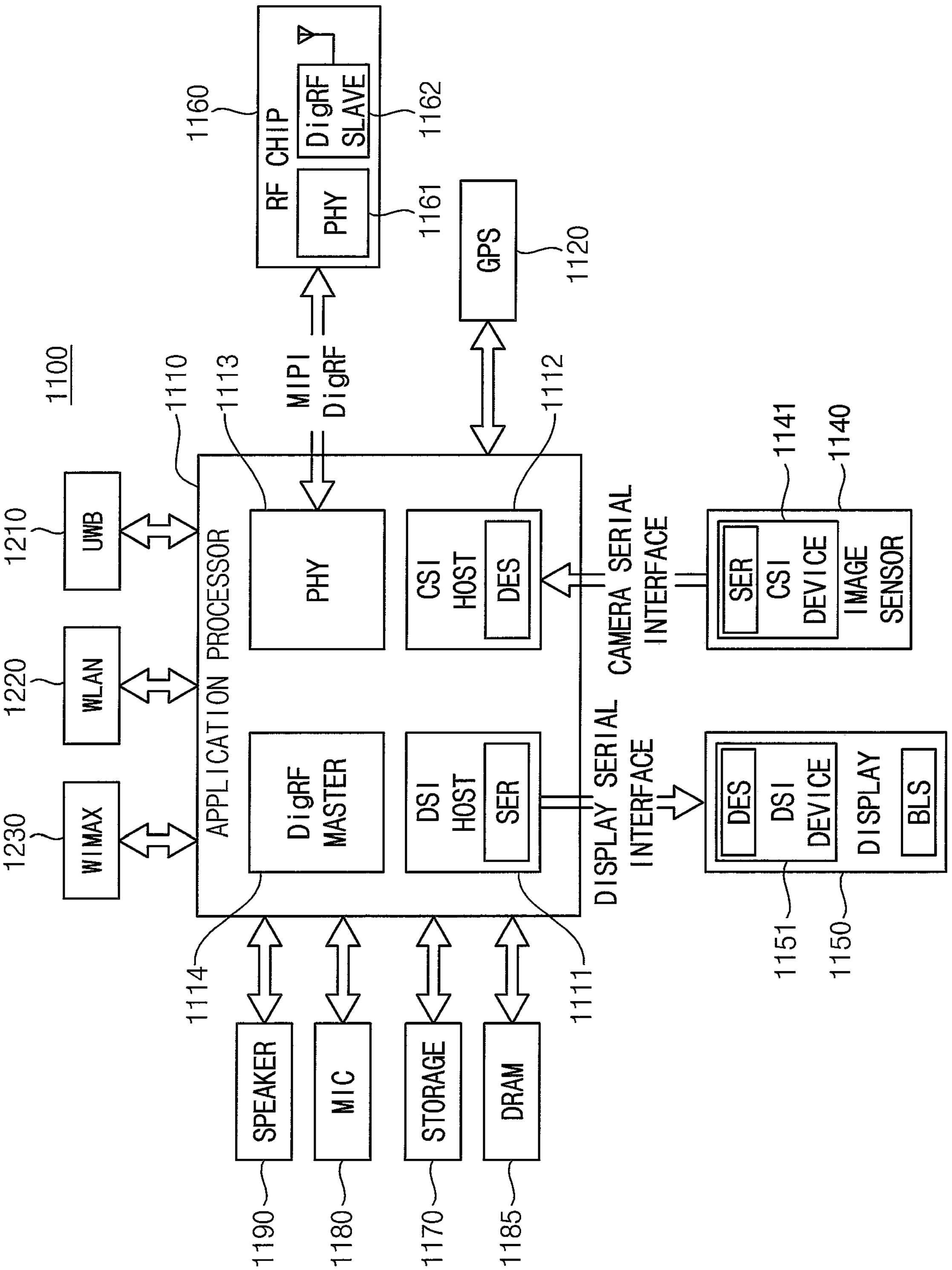
FIG. 27 is a block diagram illustrating a computing system according to example embodiments.

FIG. 27 is a block diagram illustrating a computing system according to example embodiments.

Referring to FIG. 27, a computing system 1100 may employ or support a MIPI interface, and may include an application processor 1110, a time of flight (ToF) sensor 1140 and a display device 1150. A CSI host 1112 of the application processor 1110 may perform a serial communication with a CSI device 1141 of the image sensor 1140 using a camera serial interface (CSI). In some example embodiments, the CSI host 1112 may include a deserializer DES, and the CSI device 1141 may include a serializer SER. A DSI host 1111 of the application processor 1110 may perform a serial communication with a DSI device 1151 of the display device 1150 using a display serial interface (DSI). In some example embodiments, the DSI host 1111 may include a serializer SER, and the DSI device 1151 may include a deserializer DES.

The computing system 1100 may further include a radio frequency (RF) chip 1160, which may include a physical layer PHY 1161 and a DigRF slave 1162. A physical layer PHY 1113 of the application processor 1110 may perform data transfer with the physical layer PHY 1161 of the RF chip 1160 using a MIPI DigRF. The physical layer PHY 1113 of the application processor 1110 may interface (or for example communicate) a DigRF MASTER 1114 for controlling the data transfer with the physical layer PHY 1161 of the RF chip 1160.

The computing system 1100 may further include a global positioning system (GPS) 1120, a storage device 1170, a microphone 1180, a DRAM 1185 and/or a speaker 1190. The computing system 1100 may communicate with external devices using an ultra-wideband (UWB) communication interface 1210, a wireless local area network (WLAN) communication interface 1220, a worldwide interoperability for microwave access (WIMAX) communication interface 1230, or the like. However, embodiments are not limited to configurations or interfaces of the computing system 1000 and 1100 illustrated in FIG. 22.

According to example embodiments, the display device 1150 includes a backlight system BLS including a master driving circuit and a backlight as described above. The backlight may include a plurality of slave driving circuits and a plurality of light sources driven by the plurality of slave driving circuits. The plurality of slave driving circuits may be arranged in a matrix of driving rows and driving columns such that first through m-th slave driving circuits arranged in each driving row are connected in a daisy chain structure. The master driving circuit may generate a plurality of input data signals. Each input data signal corresponding to each driving row may include first through m-th packets including luminance data to be loaded respectively to the first through m-th slave driving circuits.

As described above, the backlight system according to example embodiments may reduce the number of wirings of the backlight and enhance noise margin by connecting the slave driving circuits in the daisy chain structure and transferring the luminance data by a digital scheme. In addition, the backlight system and the method of transferring luminance data according to example embodiments may reduce the size of the backlight and increase the speed of the local dimming operation by loading the luminance data to the corresponding slave driving circuit among the plurality of slave driving circuits connected in the daisy chain structure using the virtual identifier to omit configuration and operation for imposing identifiers to the slave driving circuits.

Embodiments may be applied to a display device and any electronic devices and systems including the display device. For example, embodiments may be applied to systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a vehicle navigation system, a video phone, a monitoring system, an auto focusing system, a tracking system, a motion monitoring system, etc.

The foregoing is illustrative of example embodiments and is not to be construed as limiting thereof. Although a few example embodiments have been described, those skilled in the art will readily appreciate that many modifications are possible in the example embodiments without materially departing from the scope of the present disclosure.

What is claimed is:

1. A slave driving circuit comprising:

a shift register configured to store a reception packet by bit-by-bit shifting the reception packet, and output the reception packet;

a control circuit configured to generate a latch signal based on a value of a virtual identifier included in the reception packet, and to generate an updated value of the virtual identifier by increasing or decreasing the value of the virtual identifier;

a data register configured to latch and store luminance data include in the reception packet based on the latch signal; and a driver configured to drive a light source connected to the slave driving circuit based on the luminance data stored in the data register, wherein the slave driving circuit is configured to generate and output a transmission packet that includes the updated value of the virtual identifier.

2. The slave driving circuit of claim 1, wherein the control circuit is further configured to compare the value of the virtual identifier with a fixed address, and activate the latch signal when the value of the virtual identifier is identical to the fixed address, and wherein the data register is further configured to latch and store the luminance data included in the reception packet in response to activation of the latch signal.

3. The slave driving circuit of claim 1, wherein the control circuit is further configured to generate an address selection signal that is activated while the value of the virtual identifier is output from the shift register.

4. The slave driving circuit of claim 3, further comprising:

an address selector configured to select the updated value of the virtual identifier in response to activation of the address selection signal, and select output of the shift register in response to deactivation of the address selection signal to output the transmission packet including the updated value of the virtual identifier.

5. The slave driving circuit of claim 1, wherein the control circuit includes:

an address updater configured to generate the updated value of the virtual identifier; and an address comparator configured to compare the value of the virtual identifier with a fixed address, and activate the latch signal when the value of the virtual identifier is identical to the fixed address.

6. The slave driving circuit of claim 5, wherein the address updater is further configured to generate an address selection signal that is activated while the value of the virtual identifier is output from the shift register.

7. The slave driving circuit of claim 1, wherein the control circuit includes:

a decoder configured to check an error of the luminance data based on parity bits.

8. The slave driving circuit of claim 1, wherein the driver includes:

a digital-to-analog converter configured to convert digital values of the luminance data stored in the data register to sequentially output voltages corresponding to the digital values; and sampling and holding circuits configured to store the voltages and provide driving currents to the light source connected to the slave driving circuit based on the voltages.

9. The slave driving circuit of claim 1, further comprising:

a monitoring circuit configured to generate a monitoring current indicating a circuit characteristic of the driver.

10. The slave driving circuit of claim 9, wherein an operational deviation of the slave driving circuit is compensated for based on the monitoring current.

11. The slave driving circuit of claim 1, wherein the shift register and the driver are further configured to operate based on a clock signal that is provided from a master driving circuit that is external to the slave driving circuit.

12. The slave driving circuit of claim 11, further comprising:

a clock divider configured to divide a frequency of the clock signal to provide a divided clocks signal to the driver.

13. The slave driving circuit of claim 1, further comprising:

an oscillator configured to generate an oscillation signal, wherein the driver is further configured to operate based on the oscillation signal.

14. The slave driving circuit of claim 1, wherein the shift register is further configured to operate based on a first clock signal that is provided through a first clock pin, and the driver is further configured to operate based on a second clock signal that is provided through a second clock pin.

15. A backlight included in a backlight system, comprising:

a plurality of slave driving circuits and a plurality of light sources driven by the plurality of slave driving circuits, wherein the plurality of slave driving circuits are arranged in a matrix of driving rows and driving columns such that first through m-th slave driving circuits, where m is a positive integer greater than one, are arranged in each driving row of the driving rows, and the first through m-th slave driving circuits are connected in a daisy chain structure, wherein a master driving circuit included in the backlight system is configured to generate a plurality of input data signals, wherein each input data signal of the plurality of input data signals corresponds to the each driving row, and the each input data signal includes first through m-th packets including luminance data corresponding to the first through m-th slave driving circuits, wherein each packet of the first through m-th packets includes a virtual identifier, and wherein the virtual identifier is sequentially decreased or sequentially increased as the each packet passes through the daisy chain structure.

16. The backlight of claim 15, wherein the master driving circuit is further configured to apply the each input data signal to an m-th slave driving circuit of the first through m-th slave driving circuits, and wherein the first through m-th slave driving circuits are configured to transfer the each input data signal sequentially from the m-th slave driving circuit to a first slave driving circuit of the first through m-th slave driving circuits.

17. The backlight system of claim 15, wherein the master driving circuit is further configured to generate the each input data signal such that the first through m-th packets include respective virtual identifiers, and values of the virtual identifiers are sequentially increased or sequentially decreased, and wherein each slave driving circuit of the first through m-th slave driving circuits is configured to increase or decrease a value of a virtual identifier of a reception packet transferred from a latter stage slave driving circuit to transfer a transmission packet including the virtual identifier having the increased or decreased value to a former stage slave driving circuit.

18. The backlight system of claim 17, wherein the each slave driving circuit is further configured to compare the value of the virtual identifier of the reception packet with a fixed address, and stores the luminance data included in the reception packet when the value of the virtual identifier of the reception packet is identical to the fixed address.

19. The backlight system of claim 15, wherein the each slave driving circuit of the first through m-th slave driving circuits is further configured to simultaneously latch and store the luminance data corresponding to the each slave driving circuit.

20. A backlight system comprising:

a backlight including a plurality of slave driving circuits and a plurality of light sources driven by the plurality of slave driving circuits, wherein the plurality of slave driving circuits are arranged in a matrix of driving rows and driving columns such that first through m-th slave driving circuits, where m is a positive integer greater than one, are arranged in each driving row of the driving rows, and the first through m-th slave driving circuits are connected in a daisy chain structure; and a master driving circuit configured to generate a plurality of input data signals, wherein each input data signal of the plurality of input data signals corresponds to the each driving row, and the each input data signal includes first through m-th packets including luminance data corresponding to the first through m-th slave driving circuits, wherein the master driving circuit is further configured to generate the each input data signal such that the first through m-th packets include first through m-th virtual identifiers, respectively, and values of the first through m-th virtual identifiers are sequentially decreased by one, wherein each slave driving circuit of the first through m-th slave driving circuits is configured to decrease, by one, a value of a virtual identifier of a reception packet transferred from a latter stage slave driving circuit to transfer a transmission packet including the virtual identifier having the decreased value to a former stage slave driving circuit, and wherein the each slave driving circuit of the first through m-th slave driving circuits is further configured to compare the value of the virtual identifier of the reception packet with a fixed address that is set to be zero, and store the luminance data included in the reception packet when the value of the virtual identifier of the reception packet is identical to the fixed address.

* * * * *